(12) United States Patent
Danzl et al.

(10) Patent No.: US 9,873,427 B2
(45) Date of Patent: Jan. 23, 2018

(54) DEVICE AND METHOD FOR CONTROLLING A MOTOR VEHICLE

(71) Applicant: Audi AG, Ingolstadt (DE)

(72) Inventors: Martin Danzl, Neubeuern (DE); Sabine Wüst, Ingolstadt (DE); Torsten Gollewski, Gaimersheim (DE); Georg Kienzl, Ingolstadt (DE); Franz-Michael Hagemann, Hepberg (DE); Karl-Heinz Siedersberger, Ingolstadt (DE); Thomas Miehling, Ingolstadt (DE); Peter Kunsch, Karlskron (DE)

(73) Assignee: Audi AG, Ingolstadt (DE)

( * ) Notice: Subject to any disclaimer, the term of this patent is extended or adjusted under 35 U.S.C. 154(b) by 36 days.

(21) Appl. No.: 14/912,593

(22) PCT Filed: Jul. 19, 2014

(86) PCT No.: PCT/EP2014/001971
§ 371 (c)(1),
(2) Date: Mar. 17, 2016

(87) PCT Pub. No.: WO2015/024616
PCT Pub. Date: Feb. 26, 2015

(65) Prior Publication Data
US 2016/0200317 A1  Jul. 14, 2016

(30) Foreign Application Priority Data

Aug. 20, 2013  (DE) .................. 10 2013 013 867

(51) Int. Cl.
*B60W 30/08* (2012.01)
*B60W 30/09* (2012.01)
(Continued)

(52) U.S. Cl.
CPC ............. *B60W 30/09* (2013.01); *B60K 28/06* (2013.01); *B60W 10/04* (2013.01); *B60W 10/10* (2013.01);
(Continued)

(58) Field of Classification Search
USPC ... 701/25, 23, 24, 27, 41, 45, 301, 117, 400, 701/70, 93, 26
See application file for complete search history.

(56) References Cited

U.S. PATENT DOCUMENTS 6,926,374 B2     8/2005  Dudeck et al.
7,233,848 B2 *   6/2007  Braeuchle .......... B62D 15/0255
                                                340/475

(Continued)

FOREIGN PATENT DOCUMENTS

DE  10 2005 002 760 A1   8/2005
DE  10 2009 010 006 A1  10/2009
(Continued)

*Primary Examiner* — Richard Goldman
(74) *Attorney, Agent, or Firm* — Sterne, Kessler, Goldstein & Fox, PLLC

(57) ABSTRACT

A motor vehicle comprising at least one driver assistance system (2) to pre-calculate future driving situations of the motor vehicle (1) for a specified time interval by evaluating ego data related to the motor vehicle (1) and environmental data related to the motor vehicle environment, wherein the motor vehicle (1) is controllable by a driver in a first operating mode of the driver assistance system (2), wherein the driver assistance system (2) is designed, upon fulfillment of one switchover condition dependent at least upon future driving situations, to be temporarily switched over into a second operating mode in which the motor vehicle (1) is autonomously controlled by the driver assistance system (2) without the possibility of intervention by the driver, wherein driving is continued in the second operating mode.

23 Claims, 5 Drawing Sheets

(51) Int. Cl.
*G08G 1/16* (2006.01)
*B60K 28/06* (2006.01)
*B60W 10/04* (2006.01)
*B60W 10/10* (2012.01)
*B60W 10/18* (2012.01)
*B60W 10/20* (2006.01)
*B60W 30/095* (2012.01)

(52) U.S. Cl.
CPC .......... *B60W 10/18* (2013.01); *B60W 10/20* (2013.01); *B60W 30/0953* (2013.01); *B60W 30/0956* (2013.01); *G08G 1/161* (2013.01); *B60W 2540/22* (2013.01); *B60W 2540/24* (2013.01); *B60W 2540/26* (2013.01); *B60W 2550/00* (2013.01); *B60W 2600/00* (2013.01)

(56) References Cited

U.S. PATENT DOCUMENTS

| | | | |
|---|---|---|---|
| 8,260,482 B1 | 9/2012 | Szybalski et al. | |
| 8,290,665 B2 | 10/2012 | Placke et al. | |
| 8,330,620 B2* | 12/2012 | Swoboda | G08G 1/162 340/902 |
| 8,473,140 B2 | 6/2013 | Norris et al. | |
| 8,606,455 B2 | 12/2013 | Boehringer et al. | |
| 8,849,494 B1* | 9/2014 | Herbach | B60W 30/00 701/24 |
| 9,008,890 B1* | 4/2015 | Herbach | B60W 30/00 340/435 |
| 2009/0051516 A1* | 2/2009 | Abel | B62D 15/029 340/436 |
| 2013/0060401 A1 | 3/2013 | Hahne | |
| 2013/0173110 A1* | 7/2013 | Fuehrer | G05D 1/00 701/23 |
| 2013/0179023 A1* | 7/2013 | Schmidt | G05D 1/021 701/23 |
| 2014/0074338 A1* | 3/2014 | Nordbruch | B60W 40/08 701/23 |
| 2014/0244096 A1* | 8/2014 | An | G05D 1/0055 701/25 |
| 2014/0249721 A1* | 9/2014 | Schindler | B60W 10/04 701/41 |
| 2015/0006012 A1* | 1/2015 | Kammel | B60K 28/066 701/23 |
| 2015/0012165 A1* | 1/2015 | Israelsson | G05D 1/021 701/23 |
| 2015/0057891 A1* | 2/2015 | Mudalige | B60W 10/00 701/42 |
| 2015/0158524 A1* | 6/2015 | Lee | B62D 15/025 701/41 |
| 2015/0166059 A1* | 6/2015 | Ko | B60W 30/09 701/28 |
| 2015/0203126 A1* | 7/2015 | Kobana | B60W 50/12 701/93 |
| 2015/0235557 A1* | 8/2015 | Engelman | G08G 1/091 701/24 |
| 2015/0253352 A1* | 9/2015 | Bechtler | G01P 21/00 701/33.1 |
| 2015/0266455 A1* | 9/2015 | Wilson | G08G 1/0112 701/93 |
| 2015/0336547 A1* | 11/2015 | Dagan | B60T 7/22 701/70 |
| 2016/0052543 A1* | 2/2016 | Weinreich | B62D 5/0481 701/41 |
| 2016/0107688 A1* | 4/2016 | Schwarzkopf | G01C 21/32 701/41 |
| 2016/0200317 A1* | 7/2016 | Danzl | B60K 28/06 701/25 |

FOREIGN PATENT DOCUMENTS

| | | |
|---|---|---|
| DE | 10 2008 040 077 A1 | 1/2010 |
| DE | 10 2011 103 610 A1 | 12/2011 |

* cited by examiner

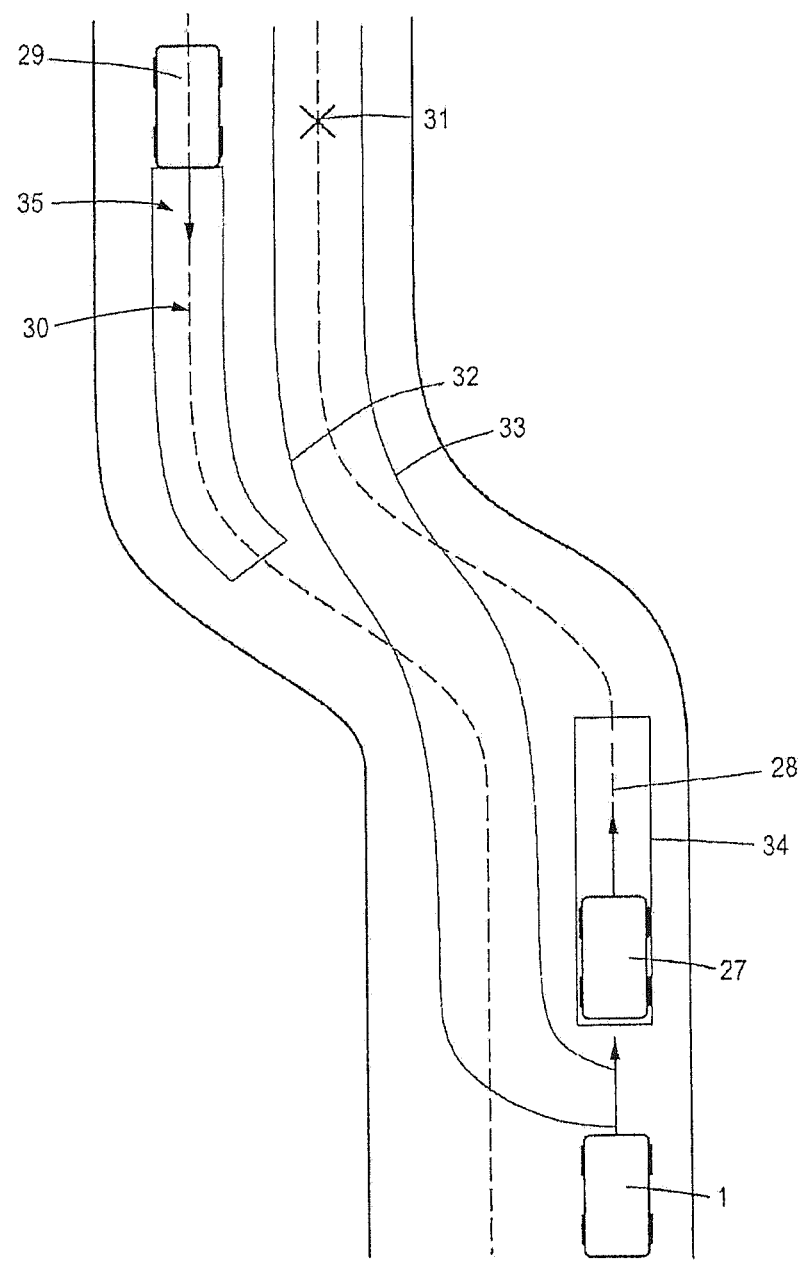

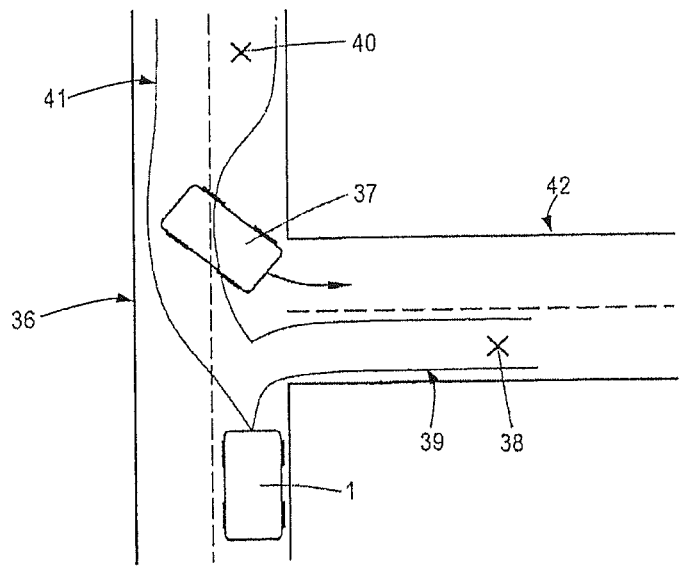
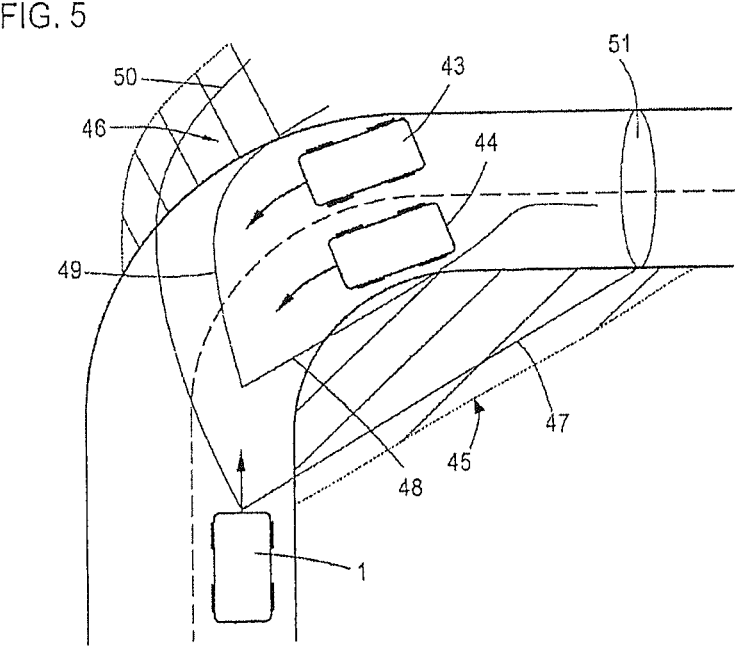

DEVICE AND METHOD FOR CONTROLLING A MOTOR VEHICLE

The invention relates to a motor vehicle comprising at least one driver assistance system to pre-calculate future driving situations of the motor vehicle for a specified time interval by evaluating ego data relating to the motor vehicle and environmental data relating to the motor vehicle environment, wherein the motor vehicle is controllable by a driver in a first operating mode of the driver assistance system.

Modern motor vehicles have a plurality of driver assistance systems used to increase driving safety and/or driving comfort. In particular, driver assistance systems are known that intervene in the control of the motor vehicle systems depending upon a current condition of the motor vehicle such as, for example, anti-locking brake systems or lane stabilization systems. In addition, comfort systems are known such as lane departure warning systems or automatic distance control systems, which calculate predictions regarding future driving situations from ego data and environmental data of a motor vehicle and control the motor vehicle according to these predictions. It is well known that these partially autonomous control systems often implement control tasks with less response time and higher accuracy than a human driver. Thus, in many driving situations, autonomous driving can result in improved driving performance of the vehicle compared to control by a human driver.

To utilize the advantages of the quicker and more precise control of the motor vehicle with an autonomous driving mode to improve safety, it is well known to use systems that detect threatening collisions with other vehicles and attempt to prevent said collisions or to mitigate the effects of the collisions. To this end, intervention is carried out in the driving operation to bring the motor vehicle to a stop in a controlled manner. The disadvantage in this case is that the position of the motor vehicle is often not ideal, wherein the vehicle brought to a standstill is an obstacle for others on the road. In addition, it is desirable to utilize autonomous driving interventions in other driving situations as well, to improve the overall driving behavior of the motor vehicle in critical situations without unnecessarily limiting the freedom of the driver.

Thus, the object of the invention is to provide a motor vehicle with improved performance in critical driving situations.

Said object is achieved with a motor vehicle of the aforementioned type according to the invention in that its driver assistance system, when at least a switchover condition dependent on the future driving situations is met, provides for the temporary switchover into a second operating mode in which the motor vehicle is controlled autonomously by the driver assistance system without the possibility of intervention by the driver, wherein the driving operation is continued in the second operating mode.

The idea upon which the invention is based is to enable a driver to have the maximum amount of freedom of action in "normal" driving situations, but to predictably detect critical situations and, in the event of such a driving situation, to intervene in the driving operation early enough, the goal being to seamlessly continue driving as soon as possible after the critical situation. In the event of such an intervention, the control, at least, of the motor vehicle is completely autonomous, that is, without the possibility of intervention by the driver. In particular, longitudinal and lateral control of the motor vehicle can be completely autonomous in the second operating mode as well. As a result of this control that is completely independent of the driver, the advantages of autonomous control can be utilized—at least, in particular, shorter response time and more precise control. In the second operating mode of the driver assistance system, the motor vehicle is not braked to a standstill, but rather driving is continued to a further point. Thus, the driver assistance system can determine a point at which no switchover condition is anticipated to be present, i.e., a point that is beyond a critical range in which the switchover condition is met.

The switchover condition can be selected such that it is met when driving situations are predicted that require driving in the physical limit range or close to the physical limit range of the motor vehicle. It is often advantageous, however, to select the switchover condition such that a switchover to the second operating mode takes place as soon as it is assumed that a driver cannot reliably control an anticipated driving situation. In particular, it is possible for the switchover condition to be dependent upon a characteristic of the driver. In this way, in a motor vehicle according to the invention, the driver assistance system can intervene in situations in which a driver can no longer reliably and comfortably control the motor vehicle, but autonomous interventions would still enable driving to continue.

The second operating mode of the driver assistance system is thus activated, in particular, when the motor vehicle is moving in the (physical or preferably driver-customized) limit range or if unexpected traffic situations suddenly occur. In order to detect such situations, the driver assistance system collects ego data and environmental data that can be provided by various motor vehicle devices. A plurality of data can be used to predict whether a switchover condition has been met, i.e., in particular, whether a critical driving situation is anticipated. In particular, the ego data may include information regarding motor vehicle components—particularly the engine, the brakes, and/or the tires. Thus, the driving behavior of the motor vehicle can be predicted particularly well in that a coefficient of friction can be estimated between the tires and the road. To this end, direct friction coefficients can be determined or specified; the friction coefficients may also be determined via the tires from other information, such as driving performance, type, and air pressure, for example. With respect to the engine and the brakes, the maximum braking and acceleration torques, in particular, are essential for determining and evaluating potential driving situations. In addition, other vehicle parameters such as, for example, a maximum steering angle can be evaluated as component information.

In addition, information that changes over time with regard to the motor vehicle such as the air speed and/or angle of pitch, roll, or yaw, and/or mass and/or location of the center of gravity and/or the steering angle of at least one wheel and/or the angle speed of at least one wheel of the motor vehicle can be recorded and used to predict future driving situations.

In addition to the information regarding the motor vehicle itself, data regarding the environment of the motor vehicle is also necessary to predict future driving situations. This information can be obtained, in particular, by using sensors on the motor vehicle and/or from information stored in the navigation system. It is advantageous when data about the road is recorded—for example, at least one curve radius and/or one local road gradient and/or a local road slope and/or a local friction coefficient and/or a road width. In addition, information should be obtained regarding potential obstacles such as other motor vehicles, pedestrians, and fixed obstacles. To do this, data may also be determined for moving obstacles in particular, such as motor vehicles and pedestrians, that enables the movement of said obstacles to be predicted. Processes and devices for obtaining environmental data are known in the prior art and will therefore not be discussed further.

An essential feature of the motor vehicle according to the invention is that, in the second operating mode, the driver assistance system only temporarily controls the motor vehicle autonomously. Thus, to this end, in the second operating mode, the driver assistance system is designed to be reset from the second operating mode back to the first operating mode when a reset condition prevails, which may also comprise multiple individual conditions. To ensure that the driver actively takes over control of the motor vehicle, it is advantageous to initially generate a takeover prompt to the driver when the reset condition is met. Thus, in particular, a visible, auditory, or haptic indication is given to the driver that the driver assistance system is ready to give the control of the motor vehicle back to the driver. The driver can actually take over control of the vehicle only when the driver has confirmed resumption of control of the motor vehicle by an action. In addition, upon resumption of control, the steering wheel movement should be recoupled to the steering action. Therefore, upon resumption of control, the steering wheel angle must equal the steering wheel angle corresponding to the current steering angle.

By temporarily switching into the second operating mode of the driver assistance system, it is possible to continue to drive normally in the motor vehicle according to the invention even after the driver assistance system intervenes. Thus, the driving of the motor vehicle is not interrupted by the intervention of the driver assistance system. Therefore, it is possible for the motor vehicle to continue to move while the driver assistance system is in the second operating mode. Because a standstill of the motor vehicle is avoided, the flow of traffic as a whole is less interrupted than with safety systems that cause the motor vehicle to stop. In addition, there is reduced stress on the driver, because driving is continued. When the driver assistance system is in operation in the second operating mode, the driver can still be notified that the driver assistance system is intervening in the driving operation to make the driver aware of the fact that the driver is moving the motor vehicle close to its physical limit range or likely outside its comfort range. Because sudden braking maneuvers and the associated fear are avoided, however, the continuation of driving is greatly facilitated for most drivers.

Obviously, continuing to drive in the second operating mode of the driver assistance system is possible only when the driver assistance system can reliably and safely guide the motor vehicle through the upcoming critical driving situation. In a few cases, however, it may not be possible to safely continue to drive. For these situations, it may be advantageous to provide an additional operating mode of the driver assistance system to minimize the consequences of such driving situations.

To this end, the driver assistance system may be designed to calculate, in the second operating mode, a prediction as to whether the switchover condition has been met at a point lying ahead in the driving direction and to determine a target position for the autonomous driving mode at which the switchover condition is likely not met. As explained, the driving operation is maintained with the process according to the invention, i.e., the vehicle will continue to move. For autonomous movement of the motor vehicle, however, it is necessary to determine a direction of movement for the motor vehicle. The goal of the temporary mode of the driver assistance system in the second operating mode is to avoid an area or to pass safely through an area in which the critical driving situation is present that has switched the control device into the second operating mode. An essential feature of the target position is that it is in an area in which the switchover condition is not met, wherein the driver assistance system predicts no critical driving situation or a driving situation that is beyond the comfort range of a driver, for example.

When the driving operation continues, it may be provided that the driver assistance system controls the motor vehicle such that a route desired by the driver is detected and the driving operation is continued along said route. Thus, it is possible that the driver assistance system is designed to evaluate ego data—particularly, route data of a navigation system—and environmental data to determine a target route of the motor vehicle desired by the driver, wherein the target position is on the target route. The driver assistance system is typically operated for relatively short distances in the second operating mode—for example, a few hundred meters—because critical driving situations are typically overcome within such distances. Thus, in determining the route, it is often sufficient to calculate a route that follows the course of the road. However, it is absolutely possible for the switchover conditions to be met in the area of a crossing or turn-off, and the driver assistance system must therefore determine the driver's desire when a suitable route is to be followed. This is especially simple when the driver has planned a route with the assistance of a navigation system, because this route can then simply be followed. However, a plurality of other vehicle systems can also be evaluated. Thus, for example, an activated turn signal can be evaluated as an indicator that the driver wishes to turn off the street on which he is driving. Typical traffic patterns may also be evaluated. Other processes for predicting a route likely to be driven are known for navigation systems. Such processes may obviously also be used in the motor vehicle according to the invention.

It is especially advantageous when the driver assistance system is designed to determine the target position such that the predicted traffic situation and/or a route enables the safe transfer of vehicle control to the driver at the target position. With the motor vehicle according to the invention, the control, at least, of the motor vehicle takes place completely autonomously; this means that the driver has no possibility whatsoever of intervening during the time that the driver assistance system is in operation. This is possible in a particularly simple way when using drive-by-wire systems in which the control of the wheels is completely mechanically decoupled from the movement of the steering wheel. In particular, with such systems, it is advantageous when the control of the motor vehicle is returned to the driver in a situation in which at least a few steering movements are necessary, because an adaptation of the steering angle to the steering wheel angle must take place before re-coupling the steering wheel to the control of the wheels, which advantageously takes place over longer timeframes and/or generates at least minor malfunctions in the vehicle trajectory. This can be compensated for to a great degree when the return of control takes place in a suitable area, wherein it is particularly advantageous when the road is relatively straight and a minimum distance from other motorists on the road is maintained.

The driver assistance system may be particularly designed for switchover from the second into the first operating mode in the presence of at least one reset condition, wherein the reset conditions, or one of the reset conditions, is that the switchover condition is not met and/or that the traffic situation makes it possible to safely return vehicle control back to the driver and/or that the target position has been reached. Failure to meet the switchover condition means that no critical driving situation is expected, i.e., a driving situation is not expected in which the motor vehicle is in the physical limit range or is moving beyond the comfort range of a driver. Then, it is no longer necessary for the driver assistance system to remain in the second operating mode. However, it is still advantageous to wait to return control of the vehicle until this is possible in a driving situation without any problems. As previously explained, a target position can be determined that can fulfill the two aforementioned conditions—in particular, even when switching into the second operating mode or with ongoing operation in the second operating mode. Thus, for the target position, it is at least predicted that the other conditions mentioned are met for switching back to the first operating mode.

With autonomous driving in the second operating mode, it is possible to control the motor vehicle in an at least section-by-section, pre-calculated trajectory. It is therefore advantageous when the driver assistance system is designed to determine a control trajectory between the current position of the motor vehicle and the target position, and to control the motor vehicle along the control trajectory in the second operating mode. A plurality of algorithms is known for determining trajectories for autonomous driving. So-called "best first" algorithms may be used to particular advantage. With this type of search algorithm, trajectories are initially calculated that predictably control for a particularly short distance or lead particularly quickly to the target. For example, an a*-algorithm can be used.

However, it is also possible for trajectories to be calculated even within the scope of the pre-calculation of future driving situations. As previously explained, switching into the second operating mode preferably only takes place if at least one possibility exists for driving through the critical situation. Thus, there is at least one known trajectory that is safely navigable by the motor vehicle. Therefore, when the future driving situations have been calculated with the assistance of trajectories, it is possible to use the corresponding trajectories directly afterwards to control the motor vehicle, i.e., as a control trajectory.

If a control trajectory is being recalculated, or if multiple trajectories are known for driving through the critical situation, an optimal control trajectory can be determined or selected. The control trajectory can be optimized, in particular, with respect to parameters relevant to safety, such as, for example, the safe distance with respect to obstacles or the spacing of the acceleration forces necessary to drive the trajectory at a maximum value for the acceleration forces. In many cases, the space of usable trajectories for the motor vehicle is sufficiently large that other parameters may also be considered, particularly for minimizing the stress on the driver during optimization. In particular, attempts can be made to minimize acceleration in the longitudinal and/or lateral directions. In addition, an attempt may be made to determine a trajectory that enables the quickest return of control of the vehicle to the driver. It is often possible to safely drive through critical driving situations using a control trajectory that deviates minimally from a predicted intent of the driver. Obviously, in calculating the control trajectory, the physical limits of the motor vehicle are considered. It is also possible, however, to consider, to the extent possible, the comfort limits of the driver.

A multitude of critical driving situations can be diffused by means of the previously explained autonomous control of the motor vehicle. That said, it is advantageous to autonomously control other vehicle systems in the second operating mode by the driver assistance system. Thus, the driver assistance system may be designed in the second operating mode for autonomous control of the brake systems and/or of the engine and/or of the steering system and/or of the—preferably—automatic transmission of the motor vehicle, without the possibility of driver intervention. In particular, it is also possible to actuate individual wheels—particularly brakes on individual wheels. It is also possible for the entire lateral control or the entire longitudinal and lateral control of the motor vehicle to take place by means of the driver assistance system. In this case, the motor vehicle may be moved along any pre-calculated trajectories that are physically drivable by the motor vehicle. This is advantageous because, with exclusively autonomous control of the motor vehicle, unexpected interventions on the part of the driver and other control systems may disturb the implementation of the calculated trajectories.

The driver assistance system may be designed in particular to calculate multiple drivable trajectories based upon the current position of the motor vehicle, with at least one boundary condition determined from ego data and/or from environmental data, and the switchover condition may be designed to evaluate the drivable trajectories. The prediction of future driving situations in detecting switchover conditions, particularly the fact that a driving situation requires driving in the range of physical limits or beyond the comfort range of the driver, can also be accomplished by calculating a multitude of potential trajectories and evaluating the trajectories. In particular, those trajectories are considered to be drivable trajectories which may be executed without negatively impacting people, the motor vehicle, and other objects. In particular, when determining drivable trajectories, parameters of the motor vehicle itself may also be considered, such as a maximum steering angle, maximum possible accelerations, the friction coefficient between tires and road, or the like. The drivability of the trajectories can also be ensured by applying the boundary conditions.

An especially simple calculation of the trajectories is possible when the trajectories are initially determined exclusively as the trajectories in the spatial domain. It is also possible, however, to calculate trajectories directly, such that they allocate fixed times to certain locations or such that a speed at a location is additionally calculated. Furthermore, trajectories may also comprise additional parameters such as, for example, alignment of a motor vehicle—particularly a side-slip angle, i.e., the angle between the alignment of the motor vehicle and the direction of movement. It is also possible to calculate the trajectories by means of a forwards- or backwards-calculating simulation of vehicle movement, which comprises a plurality of parameters, such as, for example, the previously mentioned ego and environmental data.

For example, all of the drivable trajectories can be calculated that lead to a specified street area. The endpoints of the trajectories can be determined such that they have a specified distance with respect to the motor vehicle, or the trajectories can be calculated such that they have a certain duration.

In calculating the trajectories, in addition to the boundary conditions that assure the physical drivability of the trajectories, boundary conditions that relate, for example, to minimum safety distances with respect to objects, comfort parameters such as maximum longitudinal or lateral accelerations, traffic regulations, or the like, may also be taken into consideration. If moving objects are detected in the vehicle's surroundings, the boundary conditions may also make movement predictions for these objects in particular. When considering moving objects, it is advantageous, in particular, to calculate the trajectories, not purely in the spatial domain, but rather in a space having an additional time coordinate. Moving objects, in this case, may be described as non-usable volume in this space.

It is often possible to limit the space of the calculated trajectories by considering the driver's desired target route. Such a target route can be determined, for example, by evaluating route data of a navigation system, ego data, and/or environmental data. For example, if a planned route of a navigation system leads to a crossing to the right, the calculation of trajectories that continue along the road or further to the left can be initially reset. The length of time or spatial length of the trajectories can be adapted depending upon various parameters such as, for example, driving speed, traffic density, or the course of the road.

It is possible for the driver assistance system to be designed to determine at least one driving area that is drivable by the motor vehicle based upon the position of the motor vehicle, wherein the boundary condition, or one of the boundary conditions, is that the trajectories lie completely within the driving area. In doing so, it is possible for the driving area to be determined such that areas blocked by obstacles are excluded from the driving area. It is also possible to initially allow areas blocked by obstacles within the driving area and to consider obstacles in the driving area directly in the trajectory calculation, so that the obstacles are avoided by the calculated trajectories. In this way, an area is detected through which the trajectories can extend. Typically, such an area is determined to be the area of the road that includes no obstacles; it is also possible, however, to exclude certain areas of the road or to include additional areas in the driving area. Not every part of the driving area can necessarily be reached with a drivable trajectory, because the drivable trajectories are limited—for example, by the potential steering angle of the motor vehicle.

It is possible for safe distances from obstacles to be considered when determining the driving area. Alternatively, however, the safe distances can also be considered subsequently in that all trajectories from the edge of the driving area are rejected. It must be noted that the driving area is time-independent only when no moving obstacles are present in the motor vehicle environment. Moving obstacles can be considered by determining a time-dependent driving area. To simplify the calculation, it is also possible, however, to initially exclude from the driving area all areas that are indicated as having moving objects within a specified time interval. In this way, a particularly simple calculation of trajectories is possible, even in the presence of moving objects, and a driving area that is subject to complex calculation and that is time-dependent will be used only when no trajectories, or very few trajectories, have been found using the previously determined driving area.

The parameters describing the trajectories—particularly the location coordinates—are typically continuous variables. Even with a technically constrained final solution, very many individual trajectories would thereby have to be calculated to find the possible trajectories. In order to reduce the number of trajectories, two approaches in particular are possible. Thus, it is possible for the driver assistance system to be designed to calculate the drivable trajectories as at least one parameterized band of trajectories from a multitude of drivable trajectories and/or as multiple individual drivable trajectories that are spaced apart in their parameters by a specified or adjustable distance—particularly the location coordinates. In the first case, the trajectories are thus at least partially indicated as a continuous band of trajectories. For example, when using pure location trajectories, two limitation trajectories can thus be determined from which the further intermediate trajectories can be calculated as a function of at least one parameter. A corresponding parameterization for multiple parameters is obviously simultaneously possible.

Particularly with more complex calculation processes for the trajectories, i.e., a calculation of the trajectories by means of a simulated physical model, for example, such continuous bands of trajectories, however, can be very complex to calculate. Particularly in these cases, it is advantageous to determine discrete trajectories, wherein the individual trajectories are spaced apart by a specifiable distance. Thus, the individual parameters are discretized with a definable solution. In individual cases, however, it may also be advantageous to represent trajectories comprising multiple parameters as a continuous band in some of the parameters and discretely in the other parameters.

A multitude of approaches is possible for calculating the trajectories. As previously mentioned, it is particularly simple to initially exclusively specify three-dimensional curves as the trajectories. In this case, vehicle paths are initially determined within which there is no obstacle. A vehicle path in this case is an area that can be completely covered by drivable trajectories. Such a vehicle path and the trajectories lying between the limits of the vehicle path can be described in that two geometric limiting trajectories are initially determined for the vehicle path that limit the vehicle path. Such limiting trajectories typically have a specified distance from the edge of a driving area. This means that they proceed at a specified safe distance from obstacles in the environment of the vehicle. If there is no obstacle between two of these limiting trajectories, a vehicle path is typically formed by these two limiting trajectories, if all of the trajectories between them are drivable. In addition to this, an ideal trajectory can be determined within the path of the vehicle that describes, for example, the shortest route to a specified point or section of the course, which is drivable at the highest speed or similar.

The other trajectories of the vehicle path can then be calculated by interpolating between the two limiting trajectories or between the limiting trajectories on the ideal trajectory. As an alternative, it is also possible to vary the ideal trajectory, for example, in that trajectories are calculated adjacent to the ideal trajectory that deviate in only one direction from the ideal trajectory and preferably have precisely the same number of turning points or fewer. If the process as explained is implemented for each part of the driving area through which a vehicle path is controllable, at least those trajectories within the driving area can thus be determined that are typically driven by vehicles and that are drivable at the highest speeds or result in the smallest lateral forces with respect to the motor vehicle at the specified speed.

In this context, it is important to state that it is unnecessary to determine every drivable trajectory. The calculation of the drivable trajectory initially serves only to determine whether a critical driving situation is likely pending. Critical driving situations are characterized in that the parameters that enable further traveling of the motor vehicle are, relatively, greatly limited. This means, however, that in the critical driving situations that should be detected, trajectories with a multitude of necessary turning points, for example, are not drivable anyway. It is thus sufficient when only simple trajectories having few turning points are calculated, as described.

The driver assistance system can be designed in particular to determine at least one speed profile for each of the drivable trajectories. In the simplest case, a speed profile can be determined starting from a purely geometric trajectory in that the centrifugal forces of the trajectory resulting from the mass of the motor vehicle, the speed of the motor vehicle at the point, and the local curvature, i.e., the curve radius, are compared to a specified or locally determined threshold value. The threshold value for the centrifugal force corresponds to the frictional force between the motor vehicle and the road.

In this way, it is possible for such a threshold value to be determined separately for each of the tires of the motor vehicle and to be compared to centrifugal forces acting upon said wheel. This is especially advantageous because, depending upon the roll and pitch angle of the motor vehicle, different normal forces may be acting on the individual tires, whereby the frictional force itself is different at the same friction coefficients. The coefficient of friction between the tires and the road can be specified as fixed; however, it is also possible to adjust the coefficient—for example, as a function of the type of tire, the mileage on the tire, the local properties of the road—determined with a camera, for example—or the weather conditions.

A maximally drivable speed can thus be determined for each point of the trajectory for the frictional force, considering a safety interval from the globally or locally determined maximum frictional force. If the maximum acceleration and deceleration values of the motor vehicle are additionally considered, a speed profile of the maximum possible speeds can be determined for each point of the trajectory.

If moving obstacles are not considered, such that areas occupied by them in the time interval considered are completely excluded from the driving area, speed limit values must be considered anyhow for the trajectory calculation. In this case, it is advantageous to determine at least two speed profiles for one trajectory—namely, one for the maximum speeds and one for the minimum speeds at each location of the trajectory.

As a switchover condition for switching over into the second operating mode of the driver assistance system, conditions can be used that act directly upon the quantity of drivable trajectories in particular, or those that derive the conditions for further vehicle parameters from the drivable trajectories. Thus, the driver assistance system can be designed to determine a threshold value for a vehicle parameter from the drivable trajectories, and the switchover condition or one of the switchover conditions can be the exceeding of the threshold value or the failure to maintain the limit value. The vehicle parameter may, in particular, be the current actual speed of the motor vehicle. The procedure for obtaining such a threshold value will be explained—for example, for vehicle speed. As explained, it is advantageous when at least one speed profile has been determined for each of the trajectories. In particular, a profile can be determined that indicates the maximum speeds for each point for which the trajectory can be driven with the maximum acceleration or deceleration of the motor vehicle. This calculation enables a maximum speed of the motor vehicle, at the current location of the motor vehicle with which said trajectory can be driven, to be determined for each of the trajectories.

If the speed of the motor vehicle at any time exceeds the maximum of the speeds of the trajectories at the vehicle position, then none of these trajectories will be drivable. The essential criterion for a critical driving situation is thus how close the current vehicle speed is to the fastest speed of the trajectories for the vehicle position. Thus, a speed can be selected that is 90% of the maximum speed of the trajectories at the vehicle position as the threshold value for the vehicle speed. A speed can also be selected at which a minimum number of trajectories or a vehicle path is drivable at a certain minimum width at a speed that corresponds to the threshold value.

If the threshold value is to be varied depending upon the driver—for example, to switch into the second operating mode when a comfort range of the driver is exceeded—the calculation of the threshold value can be correspondingly adapted from the trajectories, or narrower threshold values can be specified as early as the calculation of the potential trajectories, whereby, for example, the maximally allowed lateral accelerations that occur when navigating the calculated trajectories are further reduced.

The process described above enables a particularly simple determination as to whether the switchover condition is present. With the described process, however, only one single speed profile is considered. Particularly in traffic situations in which multiple moving obstacles are in the environment of the motor vehicle or during operation of the motor vehicle in a limit range in which strong speed-dependent lateral displacements of the motor vehicle may occur under certain circumstances, separate determination of the geometric shape of the trajectory and the corresponding speed profile may no longer be possible. Particularly in this case, it may be advantageous to use a switchover condition that evaluates the drivable trajectories directly, instead of a threshold value for an actual variable of the motor vehicle.

Thus, the switchover condition, or one of the switchover conditions, may be the exceeding of a minimum value for the number of drivable trajectories or a width of a value range of at least one parameter that parameterizes a band of trajectories of the drivable trajectories. The use of this switchover condition is based upon the idea that when a vehicle is far away from a physical limit range, or well within a comfort range, which limits the potential trajectories by additional boundary conditions, a very large number of trajectories is always possible, because trajectories can always be varied and continue to meet all boundary conditions. The physical limit range or the limits of a comfort range, however, are specifically defined in that the physical or comfort boundary conditions are no longer met by any trajectory once the physically possible range or the comfort range is exceeded, wherein a drivable trajectory can no longer be calculated. The respective limit range in which a switchover into the second operating mode should occur is thus characterized in that the number of drivable trajectories greatly decreases. If the trajectories are calculated as spaced, discrete trajectories, as previously described, such a decrease in the number of trajectories can thus be determined simply by a comparison of the number of trajectories with a minimum value. As soon as the number falls below this minimum value, the switchover condition is considered to be met, and the driver assistance system switches into the second operating mode. In the process, it is possible that trajectories that continuously drop below a minimum distance in at least one parameter will be counted as only one single trajectory.

However, if the drivable trajectories are represented as a parameterized band of trajectories, a decrease in the number of trajectories thus limits the value range for at least parts of the parameters of the band of trajectories. In this case, the switchover condition should therefore be dependent upon the width of the value range of at least one parameter of at least one of the bands of trajectories. A plurality of possibilities is conceivable for this. Thus, for each band of trajectories, a spatial phase capacity can be determined in that the widths of the value ranges for the various parameters of each of the bands of trajectories are multiplied. However, it is also possible to evaluate only a few of the parameters or a single parameter—in particular, a width in the spatial domain.

Therefore, the failure of the sum of the spatial phase capacities or of the product of the selected parameters of the individual trajectories to maintain a minimum value can be utilized as the switchover condition. It is also possible, however, to consider only a few of the bands of trajectories—for example, only those that proceed along a target route. In particular, only the band of trajectories in which the spatial phase capacity is the greatest, or in which the product of multiple selected parameters or an individual parameter is the greatest, may also be considered.

It is obviously also possible to reject some of the trajectories before the switchover condition is applied. Thus, before evaluating the switchover condition, when calculating the trajectories, it is possible for only some of the boundary conditions to be considered and then for those trajectories that do not meet the further boundary conditions to be rejected or not considered. In addition, or as an alternative, various boundary conditions may also be used to calculate the drivable trajectories and considered in the evaluation of the switchover condition. Thus, it is possible, for example, before evaluating the switchover condition, to initially use limit values that describe a physical limit range for calculating the drivable trajectories that reject those trajectories that are beyond a comfort range of the driver. Therefore, it is possible to initially determine whether there are a sufficient number of travel trajectories within the comfort range of the driver to leave the control of the motor vehicle with the driver. If this is not the case, wherein there are still trajectories possible within the comfort range of the driver, however, the motor vehicle can thus be controlled by the driver assistance system using one of the trajectories in the comfort range. If this is not possible, however, one of the drivable trajectories can be used for autonomous control of the motor vehicle that is physically possible, but is outside the comfort range of the driver.

Preferably, the driver assistance system can be designed for the case in which, if there is no drivable trajectory that can be determined, at least one boundary condition will be adapted and drivable trajectories recalculated. As mentioned at the beginning, it is not always possible, particularly in unexpected traffic situations occurring suddenly, to determine a physically possible trajectory in the driving area under the boundary conditions used. A drivable trajectory sometimes cannot be calculated, because certain boundary conditions were selected that do not correspond to the actual physical limits, but instead, for example, describe a comfort range of a driver. Therefore, it is advantageous when the driver assistance system is designed to adapt at least one boundary condition and to recalculate the drivable trajectories, before determining the emergency trajectory.

In particular, it is possible, when calculating the drivable trajectories, that the area outside of the road itself, i.e., the area of a road that is specified for vehicular traffic, be considered as the driving area, thus forming a boundary condition for determining the drivable trajectories. If the motor vehicle then exits the road area—for example, due to the driver's sudden steering movement or due to an unexpected traffic situation—the motor vehicle must cross an area that is not part of the road in order to return to the road. It is advantageous in this case if the driving area is adapted such that the area between the motor vehicle and the road, provided it is free of obstacles, is added to the driving area. In cases in which collisions with other motor vehicles are to be avoided, it may also be advantageous to add areas next to the road to the driving area.

It is also possible, however, to vary other boundary conditions. For example, in some embodiments of the motor vehicle according to the invention, the boundary conditions can be specified such that, in the calculation of the drivable trajectories, only drivable trajectories in a comfort range of the driver are initially determined. In this case, it is possible that the conditions be initially adapted to the actual physical boundary conditions and the drivable trajectories be recalculated, instead of an emergency trajectory being calculated. In addition, or as an alternative, it is also possible for the safe distances or safe intervals to be reduced for certain parameters. Furthermore, some vehicle systems, such as brakes, engine, or the like, for example, may have a working range in which damage to the component is possible. Typically, in this case, when calculating the drivable trajectories, the boundary conditions are initially selected to avoid this operating range.

It is possible for the driver assistance system to be designed such that, in the event that no drivable trajectory can be determined, particularly after adjusting the boundary condition, there is a switchover to a third operating mode in which an emergency trajectory is determined.

Thus, when no physically drivable trajectory exists that will avoid collision with an obstacle, the control trajectory can be determined such that personal injury, in particular, can be avoided and damage to the motor vehicle itself, other motor vehicles, or other objects can be reduced to the extent possible. The fundamental procedure for calculating such a trajectory is known to one of ordinary skill in the art and will therefore not be explained in greater detail.

Thus, a tiered intervention in the driving operation is possible in the process according to the invention. In doing so, it is initially possible to determine drivable trajectories under relatively narrow boundary conditions that consider a comfort range of the driver, in particular. Using these trajectories, if it is determined that the switchover condition is not met, which typically means that a multitude of various trajectories is possible within the first boundary conditions, there is no intervention in the driving operation, and control of the motor vehicle remains with the driver. If the switchover condition has been met and drivable trajectories have been determined under the first boundary conditions, the driving operation can thus be continued along one of these drivable trajectories in the second operating mode. Therefore, it is possible, in particular, to continue driving along a desired target route in the comfort range of the driver. If no drivable trajectory was determined under the first boundary conditions, one or more of these boundary conditions can be adapted. In particular, a limitation of the trajectory parameters can be relinquished to the comfort range of the driver. If at least one trajectory is determined with the second boundary conditions thus formed, the driving operation can be continued; however, as driving continues, it is possible to leave the comfort range of a driver, for example. If no drivable trajectory can be determined even after possible repeated adaptation of the boundary conditions, then an emergency trajectory is determined. The target position is not reached with such an emergency trajectory; this means that driving does not continue. With the calculation and execution of an emergency trajectory, the typical functions of a collision avoidance or collision damage mitigation system are achieved; this means that attempts may be made to bring the vehicle to a safe stop or to mitigate collision damage. Thus, in the motor vehicle according to the invention, an intervention in the driving operation is possible which is graduated according to the criticality of the driving situation.

When the driver assistance system is being operated in the second operating mode, at least parts of the motor vehicle control are taken away from the driver. In addition, there may be unusually high accelerations in the longitudinal or lateral direction of the motor vehicle. Thus, it is advantageous if the driver assistance system is designed to activate an indicator to give an audible, haptic, and/or visible warning when switching over into the second operating mode and/or before switching over into the first operating mode, as an indication for the driver to resume control. An indicator for resumption of driver control is advantageous to indicate to the driver that the driver should now again be responsible for the control of the motor vehicle.

The motor vehicle can have a communication device for wireless vehicle-to-vehicle communication and/or for wireless vehicle-to-infrastructure communication, wherein the driver assistance system is designed to evaluate environmental data by activating the communication device for communication with information sources and/or for communication with other motor vehicles to transmit warning messages, particularly when switching over into the second operating mode. In particular, information regarding at least one other motor vehicle—for example, its position, speed, steering angle, trajectories, and/or planned maneuvers—can be received by the communication device. The prediction of the movement of this motor vehicle can be improved by this information, whereby more reliable planning of the vehicle's own driving operation is possible. However, it is also possible to access external databases via the communication device. In particular, databases can replace or supplement information in the vehicle's own navigation system. Precise information regarding the course of the road, particularly the angle of inclination, slopes, curve radii, and the like, are necessary for reliable trajectory calculation. If such data is not stored in the motor vehicle or in a navigation system, it can be retrieved wirelessly from a database—particularly, some time before the corresponding section of road is driven.

Giving a warning signal to other vehicles is particularly advantageous, because the second operating mode is used particularly in emergency situations or when the vehicle is being driven in the physical limit range or beyond a comfort range of a driver. Thus, there is an increased probability that unexpected driving maneuvers or driving maneuvers in the physical limits of the motor vehicle will be implemented in the second operating mode. It is therefore advantageous for other motor vehicles to maintain an additional safe distance from the motor vehicle in question. It is also possible for the communication device to transfer driving information to the other motor vehicles so that, for example, a larger driving area may be utilized in emergency situations.

Critical situations in which reliable control of the motor vehicle is no longer possible occur when the driver is no longer capable of properly controlling the vehicle—for example, because the driver is ill, overly fatigued, or overburdened by a situation. If the driver is no longer capable of properly controlling the vehicle, it is still desirable, at least in the medium term, to bring the vehicle to a stop; that said, it may also be advantageous to continue to operate the motor vehicle and autonomously drive it to an advantageous parking location. Because, in this case, it would not be desirable to return control of the vehicle to the driver before the vehicle is parked, it is advantageous if the driver assistance system separately detects this event and switches into a separate operating mode.

The driver assistance system can thus be designed for autonomous control of the steering and/or of the braking systems and/or of the engine and/or, in particular, of the automatic transmission of the motor vehicle in a fourth operating mode without the possibility of intervention by the driver, and the motor vehicle can be brought into a safe parking position. The parked motor vehicle is thus not a traffic obstacle for others on the road. In the fourth operating mode, the vehicle is brought into a safe parking position completely autonomously. The safe parking position can be relatively close by—for example, the hard shoulder of an interstate; however, the vehicle may be driven a longer distance—for example, up to the next rest area. In particular, when it has been determined that the driver is ill—for example, because of a heart attack—it is also possible for an emergency call to be made via a communication device in the motor vehicle.

In particular, the motor vehicle may comprise a means for detecting the condition of the driver to determine the driver's condition, and the driver assistance system may be designed for switchover into the fourth operating mode when the driver's condition indicates that the driver is incapacitated. Thus, a driver's condition can be determined, for example, by a camera and the determination of a seated position or eye position. It is also possible to determine, for example, the pulse or the heartbeat of a driver, or operating actions such as steering movements. Driver fatigue and sickness, in particular, can also be determined by various means.

In addition or as an alternative, it is also possible for the driver assistance system to be designed to wait for input from a driver to resume driver control during a switchover from the second operating mode to the first operating mode and, if this input does not occur within a specified time interval, to switch over into the fourth operating mode. In particular, a repeated warning can be given to the driver with particularly increasing intensity before switching into the fourth operating mode. This warning can be supplemented by further interventions in the driving operation, such as continuous deceleration of the motor vehicle or the like. Switching into the fourth operating mode in this case is advantageous, because continued operation of the motor vehicle is not desirable when the driver is not capable of resuming or does not wish to resume control of the vehicle.

In addition, the driver assistance system can be designed to switch over to the fourth operating mode when it is determined that a defined minimum number and/or a defined minimum frequency of switchovers from the first into the second operating mode have been made within a specified timeframe. Regular switchover of the driver assistance system to the second operating motor indicates that the driver is regularly incorrectly estimating the driving situation or is no longer capable of controlling the motor vehicle. This may indicate that the driver is fatigued or unable to concentrate, is in a distracted state of mind, or is unconscious. In this case, it may be advantageous to temporarily stop the vehicle. The defined timeframe, in particular, may be a trip with the motor vehicle, i.e., the time from starting to switching off the motor vehicle; it may also be a defined time period such as, for example, one or two hours, or a certain distance traveled by the motor vehicle.

During the switch of the motor vehicle into the fourth operating mode, it can be assumed that the driver is no longer capable of driving. This may also be an emergency situation, however, in which it is justified to limit the driving freedom of the other motor vehicles to enable quick and safe parking of the motor vehicle. It is therefore possible for the motor vehicle to comprise a communication device and the driver assistance system to be designed to determine a target driving maneuver, in the fourth operating mode, for at least one other motor vehicle and to activate the communication device to transmit the target driving maneuver to the motor vehicle, wherein, in addition to the target driving maneuver, a priority message may be transmitted, in particular.

A provision may be made for the motor vehicle to be designed to also receive such messages, wherein, in particular, a message with the highest priority is possible to indicate an emergency situation. Upon receipt of a message with such priority information, the driver assistance system may be designed to execute said target driving maneuver to the extent that this is safely possible.

Different drivers have very different comfort ranges in which they can comfortably and reliably control motor vehicles. Therefore, it is advantageous when the switchover condition and/or the boundary condition for calculating the drivable trajectories and/or the determination of the control trajectory is dependent upon a defined driver characteristic or a driver characteristic determined by the driver assistance system. It is especially possible for the driver characteristic to be adjustable by self-estimation on the part of the driver and a control element. Thus, the driver assistance system can be adjustable, for example, between the settings of "sport" and "comfort." It is also possible, however, for the characteristics of the driver to be recorded, such as age of the driver, fatigue, and the like. As an alternative or in addition, it is also possible, however, to record or adapt the characteristic by means of a sensor system on the motor vehicle. For example, the steering movements can be evaluated, or the driver can be observed by a camera or another sensor system.

It is especially possible for a driver-dependent warning condition to be provided that can be precisely implemented technically like the switchover condition, wherein, however, other boundary conditions, limit values, or the like are utilized. When a warning condition is met, a warning can initially be generated to indicate to the driver that trajectories outside of the driver's comfort range are now being driven. In addition, a switchover condition can be adapted such that a driver can be initially warned that the driver's comfort range is being exceeded and that, starting at a certain degree of exceeding the comfort range, there may be a switchover into the second operating mode, so that autonomous driving takes place only just beyond the comfort range of the driver.

Furthermore, the invention relates to a process for controlling a motor vehicle comprising at least one driver assistance system and at least one detection means, wherein the motor vehicle is controllable by a driver in a first operating mode of the driver assistance system, comprising the following steps:

Detection by the detection means of ego data relating to the motor vehicle and environmental data relating to the motor vehicle environment;

Pre-calculation of future driving situations of the motor vehicle by the driver assistance system by evaluating the ego data and the environmental data;

Check by the driver assistance system as to whether a switchover condition dependent at least on the future driving situations has been met;

Temporary switchover into the second operating mode of the driver assistance system if the switchover condition is met;

Autonomous control of the motor vehicle to continue driving with the driver assistance system in the second operating mode without the possibility of intervention on the part of the driver;

The process can obviously be further embodied in a manner similar to that for the described motor vehicle.

Additional advantages and details of the invention follow from the exemplary embodiments, as well as from the corresponding drawings. The following is shown:

FIG. 3 shows a traffic situation;

FIG. 4 shows another traffic situation;

FIG. 5 shows a third traffic situation;

Figure 1:
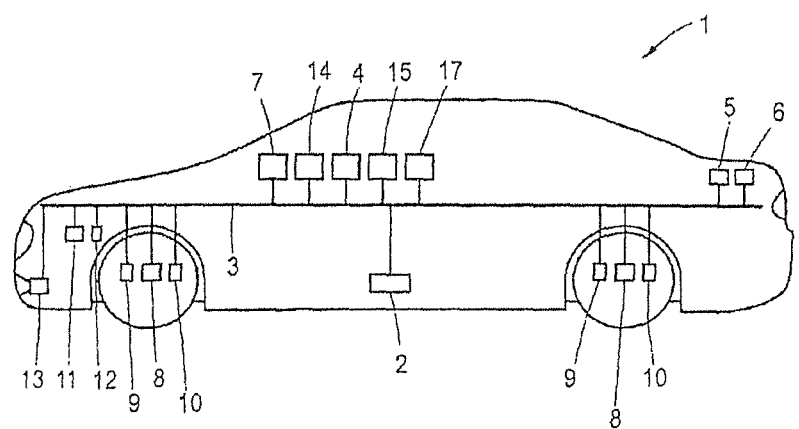
FIG. 1 shows a schematic view of an exemplary embodiment of the motor vehicle according to the invention.

FIG. 1 shows a motor vehicle 1 having a driver assistance system 2, which, when a critical situation is determined, is designed for the autonomous control of the motor vehicle 1 when the vehicle is likely being moved into the physical limit range or beyond a comfort range of the driver within a defined time interval. The motor vehicle 1 is equipped with a drive-by-wire system such that, in normal driving operation, the steering movements of a driver are detected by a steering angle sensor 7, and the steering movements, after further processing by a control system (not shown), may be transmitted to the steering system 8 via the CAN bus 3. In a similar manner, actuations of a brake pedal (not shown), accelerator pedal, and a control element of the gear shift can be transmitted to the corresponding devices of the motor vehicle 1. During normal operation, the motor vehicle 1 is controlled primarily by the driver. Thus, the driver can either control the vehicle completely, or the driver can be supported while controlling of the motor vehicle by driver assistance systems such as, for example, an automated distance control, lane departure warning assistance, or the like. In a first operating mode representing typical driving, it is essential that the driver always has complete control of the vehicle, i.e., can override the supporting driver assistance systems at any time.

During operation of the motor vehicle 1, the driver assistance system 2 can always query information on a multitude of vehicle systems via the CAN bus 3 in order to calculate in advance future driving situations of the motor vehicle 1 for a defined time interval. The vehicle assistance system 2 can use data from a navigation system 4 to determine a planned route of the motor vehicle 1 and additional information regarding the course of the road—for example, an incline or gradient of the street, curve radii, local traffic regulations, and the like. The data obtained from the navigation system 4 can also be supplemented by data from an environmental sensor 13 designed as a camera. The motor vehicle also has a device for determining position 5 for determining the vehicle position—for example, a GPS sensor.

In addition, the driver assistance system 2 can obtain additional environmental information via a communication device 6 by communicating with other motor vehicles via car-2-car communication or with infrastructure devices and/or other motor vehicles via car-2-X communication, for example. In this way, direct information can be obtained regarding the driving behavior of other motor vehicles and the like to calculate an improved environmental model. To supplement the environmental model, wireless communication can also take place via the communication device 6 with databases—particularly, Internet databases.

The driver assistance system 2 is additionally designed to read a multitude of sensors that measure a parameter of the motor vehicle 1. Thus, the setting of an automatic transmission 12 and/or the parameters of engine control 11 can be processed. A steering angle of the motor vehicle 1 can be determined from the data of a steering angle sensor 7, as well as at a steering system 8 of arranged sensors. Additional sensors are sensors on the braking system 10 or rotation sensors 9 on the wheels.

A dynamic model for the particular motor vehicle, as well as a detailed environmental model, can be calculated from the substantial amount of ego data on the motor vehicle 1 and the substantial amount of environmental data, wherein, in particular, the movement of other motor vehicles can be predicted by means of another dynamic model. The driver assistance system 2 can determine potential future driving situations, in that multiple possible trajectories are determined for the motor vehicle 1. Such trajectories, in particular, can proceed on a target route of the motor vehicle determined by the driver assistance system 2. The duration or spatial length of the trajectories may depend on the traffic density and/or on the speed of the vehicle.

Such trajectories can be determined by initially determining a driving area for the motor vehicle 1 in which it is possible for the motor vehicle 1 to drive. Trajectories that are geometrically drivable by the motor vehicle 1 are initially determined, and speed profiles for these trajectories can then be determined. As an alternative, in this case, it is also possible to directly calculate trajectories as trajectories comprising both location and speed data, as well as possibly other parameters.

The trajectories calculated in this manner can be used in many different ways to determine whether a critical driving situation for the motor vehicle is to be expected. In particular, at least one threshold value for a vehicle parameter can be determined from the potential trajectories—particularly the vehicle speed—and a critical state can be determined when this limit is exceeded—for example when a maximum speed calculated from the trajectories is exceeded—and the vehicle can be switched into the second operating mode in which the motor vehicle is operated autonomously without the possibility of intervention by the driver. As an alternative or in addition to this, the driver assistance system 2 can also evaluate the trajectory data directly. In particular, an evaluation is carried out to determine whether an area covered by the trajectories, i.e., a vehicle path, has a certain minimum width or whether a certain minimum number of trajectories spaced apart are drivable by the motor vehicle. If the minimum number of trajectories or the minimum width of the vehicle path is not reached, and at least one drivable trajectory has been determined, the driver assistance system 2 switches into the second operating mode. In the second operating mode, the steering system 8, the braking system 10, the engine 11, as well as the automatic transmission 12 are autonomously controlled by the driver assistance system 2 such that the motor vehicle 1 is moved by the control device 2 along a control trajectory selected from the drivable trajectories.

It can also be determined whether a safe drivable trajectory is even possible for the motor vehicle. A "failure to find" a drivable trajectory can have various causes. Thus, in the determination of the drivable trajectory, limits can be used depending upon a comfort range of the driver. The comfort range of the driver can be preset via a control element 14. As the motor vehicle is being operated, the driver assistance system 2 can additionally evaluate the trajectories being driven by the driver and adapt the comfort range accordingly. Failure to find a drivable trajectory then means only that the comfort range of the driver must be exceeded. Other threshold values can then be specified that will always assure that the trajectory determined is physically drivable, wherein, however, driving the motor vehicle 1 along this trajectory may be outside of the comfort range of the driver, i.e., relatively great lateral accelerations may occur, for example.

Failure to determine a drivable trajectory may, however, be due to the fact that there is no safe drivable trajectory in a predefined driving area. In this case, the driver assistance system 2 can calculate safe trajectories in which the driving area is redefined, areas next to the road are added to the driving area, and new trajectories are then determined.

However, it is also possible, particularly in an unexpected traffic situation, that there is no trajectory that can be calculated in which safe driving is possible. Thus, depending upon the behavior of the drivers of other motor vehicles, there may be situations in which an accident cannot be avoided by the motor vehicle 1 in question. In these cases, it is possible for the driver assistance system 2 to switch into a third operating mode in which an emergency trajectory is calculated such that personal injury or damage to the particular motor vehicle and third-party vehicles is minimized.

The determination of trajectories for the motor vehicle 1 and the evaluation of these trajectories with regard to meeting switchover conditions in various operating modes will be explained later with reference to the driving situations shown in FIGS. 2 to 5. The corresponding process for controlling a motor vehicle will be described with reference to FIG. 7.

The driver assistance system 2 can evaluate the data of a means for detecting a driver's condition 17. The means for detecting a driver's condition 17 is designed as a camera, which takes an image of the driver and records the eye blink or a seated position of the driver, for example, and draws a conclusion about a driver's condition. Further information regarding a driver's condition can be determined by evaluating the driver's steering movements or other control interventions. The driver assistance system 2 can detect a driver's state with the help of this input data and determine, in particular, when a driver is not fit to drive. Such unfitness to drive on the part of the driver can be caused, for example, by illness of the driver—in particular, a heart attack or excessive fatigue.

If such a condition of the driver is ascertained, then the motor vehicle 1 should typically no longer be operated. Immediate parking of the motor vehicle 1, however, would result in the motor vehicle being stopped in a potentially unfavorable location in traffic. Therefore, the driver assistance system 2 is designed to switch into a fourth operating mode in which the motor vehicle is autonomously driven to a safe parking location, when it is determined that the driver's state indicates unfitness to drive. Such a safe parking location may be, for example, a hard shoulder of an interstate, a rest area, or the like. Particularly when it is determined that the driver is unfit to drive due to illness, it is also possible for the driver assistance system 2 to transmit an emergency signal via the communication device 6.

The motor vehicle should be safely parked as soon as possible. In numerous traffic situations however, particularly when the vehicle is being driven in the passing lane of an interstate, a path to a safe parking position may be blocked by others on the road. In this case, the driver assistance system 2 can determine target driving maneuvers for other motor vehicles by evaluating the environmental data and transmit these maneuvers to these motor vehicles via the communication device 6. In doing so, it is possible to transmit a priority message along with the target driving maneuver that indicates to the other motor vehicles that there is an emergency situation at hand, and that the driver of the motor vehicle 1 in question is incapacitated.

Accordingly, upon receipt of a target driving maneuver with a corresponding priority from the communication device 6, the driver assistance system of the motor vehicle 1 in question switches into a fifth operating mode of the driver assistance system 2, in which the received target driving maneuver is implemented, to the extent that this is safely possible. By using priority information and the transmission of target driving maneuvers, it is possible to especially quickly and especially safely park a motor vehicle 1 having an incapacitated driver.

The communication device 6 for communicating with other vehicles can also be used in cases in which other critical driving situations are ascertained. In the simplest case, the driver assistance system 2 can activate the communication device 6 for transmitting a warning signal to other motor vehicles when switching into a second or third operating mode in which the motor vehicle is autonomously controlled because a critical situation is predicted. In order to warn the driver when switching into or out of the autonomous driving operation, a warning device 15 is provided that audibly alerts the driver.

Figure 2:
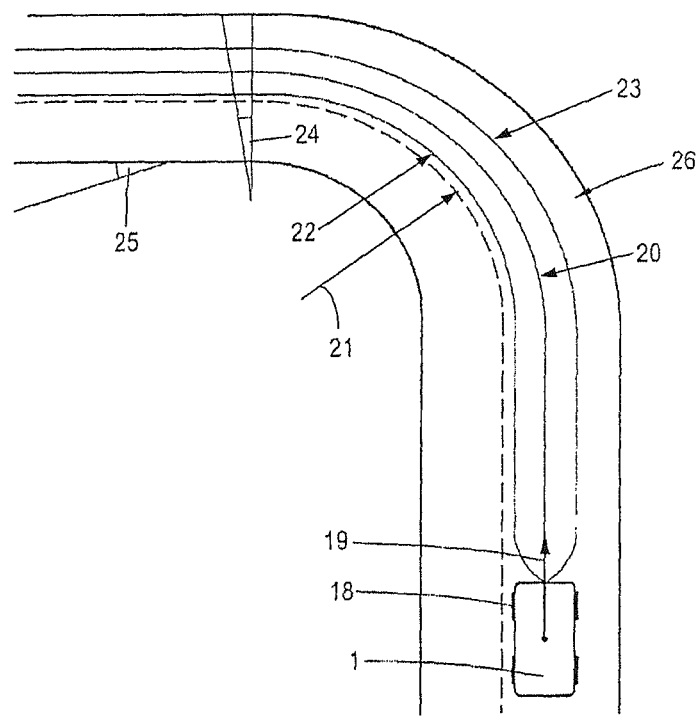
FIG. 2 shows a schematic view for determining the possible trajectories in the driver assistance system of the motor vehicle according to the invention.

FIG. 2 shows a driving situation in which the motor vehicle 1 is moving towards a curve 26. The possibility of determining potential trajectories for the motor vehicle is explained in this drawing by using an example. The driver assistance system 2 of the motor vehicle 1 has available a multitude of ego data on the motor vehicle. In addition to information on a planned route for the motor vehicle 1, which, in particular, describes a movement of a motor vehicle over a longer time period, this ego data comprises data regarding the current condition of the motor vehicle, such as the air speed of the motor vehicle 1, the amount and direction of which is indicated by the arrow 19, an angle between the motor vehicle 1 and the course of the road, as well as an angle between the motor vehicle 1 and the direction of movement, the so-called side-slip angle, the weight of the vehicle, the position of the vehicle's center of gravity, as well as information regarding the individual wheels 18—in particular, a steering angle of the wheels 18—the angular velocity of the wheels 18, as well as the frictional coefficients of the wheels 18. Information regarding the other parameters of the motor vehicle, such as maximum acceleration and deceleration capacity, can also be included in the calculations. A multitude of these parameters can be determined by sensors in the motor vehicle 1; however, it is also possible for individual parameters—for example, the frictional coefficients of tires or the maximum deceleration and acceleration—to already be stored in the motor vehicle 1.

In addition to the ego data, the most exact environmental model possible is required to calculate the potential trajectories. Parameters of the environment may be obtained, for example, from a database integrated into the navigation system 4; however, it is also possible to use other data in the vehicle or external databases. Such stored data may also be supplemented by data from the vehicle sensors, particularly by data from a camera.

In the traffic situation shown in FIG. 2, there are initially no other motor vehicles or other moving obstacles. Here, only an environmental model without moving obstacles and the calculation of trajectories are addressed for this case. Thus, only environmental data relating to the roadway are initially considered as the environmental data. A roadway can be described by a local curve radius 21 of the road, a local road slope 24, and a local road gradient 25. Based upon this data and on the ego data on the motor vehicle, possible trajectories can be calculated in various ways. In the following, a calculation of the trajectories shall be used as a simple example in which trajectories are initially determined as pure loci for which at least one possible speed profile is determined in a separate step. Obviously, as an alternative, it is possible to use a more precise process for trajectory calculations, which considers, for example, the roll angle and pitch angle of the motor vehicle or which can even calculate a drift movement of the motor vehicle, i.e., a movement having a high side-slip angle.

For merely geometric calculation of trajectories, the limit trajectories, 22 and 23, which limit the vehicle's drivable path, can first be calculated. These limit trajectories 22, 23 are determined, on one hand, by the limited maximum steering angle of the motor vehicle 1 and, on the other hand, by the driving area. In the example shown in FIG. 2, the driving area is selected such that it is always possible for a motor vehicle coming from the opposite direction to pass, wherein the motor vehicle is always on the road. The limit trajectories 22, 23 thus extend away from the motor vehicle essentially parallel to the boundaries of the road. These limit trajectories 22, 23 are curved only in the immediate vicinity of the motor vehicle, because the steering angle of the motor vehicle is limited. It is possible for the extension of the limit trajectory 22, 23 to deviate from the course of the road when the course of the road has sudden changes of direction that have a larger angle than the maximum steering angle of the motor vehicle.

Additionally, an ideal trajectory 20 is determined that can be calculated with an a* process. The geometrically possible trajectories can be determined in that a multitude of intermediate trajectories are determined between the ideal trajectory 20 and the limit trajectories 22, 23. In doing so, the steering angles can be varied in the area of the actual position of the motor vehicle to maintain a continuous transition between the various predetermined trajectories. The trajectories lying between trajectories 20, 22, 23 may be determined in many different ways, however, wherein usually only those trajectories are determined that have a maximum predefined number of turning points. Trajectories with a multitude of turning points are typically only those having a large number of turning points that are drivable at substantially lower speeds. Thus, they are not essential for moving the motor vehicle within the physical limit range.

In addition, it should be noted that it is also possible to pre-calculate only trajectories 22, 23 and to fill the space between these trajectories exclusively by means of an interpolation between these trajectories. The geometric trajectories may be determined as individual trajectories by calculating trajectories with a defined distance of a few centimeters, for example. However, it is also possible to calculate the trajectories as one or more bands of trajectories that are parameterized by at least one parameter. For example, trajectories can be defined by means of a degree of curvature and length of the curved area or the like. If value ranges are specified for the parameters in such a description of the trajectories, it is thus possible to represent a multitude of trajectories very compactly.

A speed profile can then be allocated to each of the individually calculated trajectories. If the trajectories are defined as a band of trajectories, it is also possible to likewise parameterize the speed profile. The speed profile describes a course of the speed of the motor vehicle 1 upon a movement along the trajectory, wherein a movement along the trajectories at these speeds meets one or more threshold conditions. A decisive threshold condition in this case is that the centrifugal force acting upon the motor vehicle 1 in the curve does not exceed the static frictional force between the tires 18 of the motor vehicle 1 and the road. Static frictional force between the motor vehicle and the road can be determined, in the simplest case, from the vehicle mass and a friction coefficient between the road and the tires. However, it is also possible to consider, for example, the pitch angle and roll angle of the motor vehicle, whereby the normal forces acting on the individual tires of the motor vehicle differ from one another and thus different frictional forces are present for each of the tires 18 of the motor vehicle 1.

The coefficient of friction for the tires is specified for the motor vehicle depending upon the type of tire. It is also possible to adapt this frictional value to the tires depending upon the driving performance of the tires or to determine it dynamically in certain driving situations. A frictional value for the road can be estimated as a fixed value. However, it is advantageous to adjust this value as a function of information from a navigation system and from one or more vehicle sensors, for example. The type of road surface is determined by a camera or from the data of a navigation system. A good prediction for the frictional value can be determined from the type of road surface. In addition, impurities from the road can be determined by a camera or image evaluation, and the local coefficient of friction can be adjusted accordingly. Furthermore, weather conditions can be taken into consideration—in particular, the temperature and the wetness of the road.

By comparing the frictional force between the motor vehicle 1 and the road, or between the individual tires and the road, with the centrifugal forces occurring for the trajectories, threshold speeds can be determined for which the frictional force and the centrifugal force are equal. Advantageously, however, additional accelerations can also be included in this comparison by acceleration or deceleration of the motor vehicle. The amount of the total vector of the longitudinal and lateral acceleration of the motor vehicle multiplied by its mass must not exceed the frictional force. This corresponds to the principle of Kamm's circle. Typically, a maximum speed profile is determined for a trajectory, wherein, in particular, when determining the maximum speed profile, safe distances are provided between the acceleration forces acting on the motor vehicle by the trajectory and the frictional force.

As a result, there are a multitude of drivable trajectories within the driver assistance system 2, each of which has a locus and a speed profile allocated to the locus. To determine whether a critical driving situation is pending, the trajectories calculated in this manner can be determined in many different ways. Thus, trajectories that do not meet certain threshold conditions, particularly an initial speed that is less than the current speed of the motor vehicle 1, are rejected, and the number of trajectories that have been determined or the value range of at least one parameter of a band of trajectories is then determined.

If a driving situation is non-critical, there is always a plurality of trajectories possible for the motor vehicle. The closer the motor vehicle moves to the edge of a comfort range or to a physical limit range, the fewer trajectories are possible for driving within the comfort range or within the physical limit range. Thus, the number of trajectories determined can be used to determine whether a critical driving situation is pending while considering the corresponding limit conditions or the width of the value ranges upon determining parameterized trajectories. As an alternative, however, limit values may be determined for at least one actual parameter of the motor vehicle from the trajectories determined. In the simplest case, the speed values at the starting point can be evaluated for each of the trajectories, and an upper limit for the speed of the motor vehicle 1 can be specified such that, for example, a speed is used at which a number of trajectories are drivable, or that does not exceed a certain percentage of the maximum speed of the fastest-possible trajectory.

Because a multitude of trajectories and thus a switchover condition is already present when using trajectories to determine the presence of a critical driving situation, it is particularly simple to determine a control trajectory, because it can be selected from the previously calculated drivable trajectories. If it is determined, however, during the calculation of the trajectories, that no trajectory is possible under the specified threshold conditions, an emergency trajectory must be calculated, wherein the threshold conditions can be adapted to calculate the trajectories.

Meeting the switchover condition and selecting a control trajectory will be presented below. If the motor vehicle 1 is moving at low speed, all of the trajectories between the limit trajectories 22, 23 are drivable. The geometric shape of the calculated trajectories is limited only by the specification of a maximum number of turning points. The switchover criterion is the width of the band of trajectories at the apex of the curve 26, i.e., at low speeds, the distance between limit trajectories 22 and 23 perpendicular to the direction of travel.

At higher speeds of the motor vehicle 1, some of the trajectories that are drivable at low speeds will no longer be drivable. In the physical limit range, only one or more discrete ideal trajectories are still drivable. As the speed increases, the geometric width of the band of trajectories thus narrows until only the ideal trajectory 20 is still drivable. If the width fails to reach a defined threshold value, the driver assistance system switches into the second operating mode and autonomously controls the motor vehicle 1 along the ideal trajectory 20.

Once the curve 26 has been traversed, a broad band of trajectories is again drivable. Thus, depending upon the traffic situation, the driver assistance system can switch into the first operating mode.

FIG. 3 shows a traffic situation in which the driving range of the motor vehicle 1 is limited by other motor vehicles 27, 29, which are moving obstacles. The driver assistance system 2 of the motor vehicle 1 calculates a target position 31, which lies on the target route of the motor vehicle for motor vehicle 1. Motor vehicle 1 is moving at a speed that is greater than motor vehicle 27 traveling in front of it. If motor vehicle 1 continues to travel at an increased speed despite a relatively small distance from motor vehicle 27, it must be assumed that the driver of motor vehicle 1 wishes to overtake motor vehicle 27. In this case, the driver assistance system 2 must determine whether it is possible to overtake motor vehicle 27 and whether this would possibly lead to a critical driving situation. By using the sensor systems of motor vehicle 1 and known algorithms for movement prediction, a trajectory 28 can be predicted for motor vehicle 27, and a trajectory 30 can be predicted for motor vehicle 29. For simplified representation, it should be assumed that motor vehicle 1 will continue to move at an essentially unchanged speed.

With continued movement at the same speed, areas 34 and 35, which are covered by motor vehicles 27 and 29, can be determined by the time motor vehicle 1 has passed the other respective motor vehicle. To prevent collisions, these areas 34, 35 must be excluded from the calculation of the trajectory of motor vehicle 1. In this case, it must be noted that a more complex calculation of the trajectory of motor vehicle 1 is possible—for example, in that the trajectories are planned in a three-dimensional space from two location coordinates of a time coordinate, wherein moving obstacles block part of this three-dimensional space. Such a process enables the planning of a larger number of trajectories, which in some cases can lead to an improved driving performance; however, this type of calculation is substantially more complex.

The driving area is thus defined by the area of the road as well as by the exclusion of areas 34 and 35, which are covered by motor vehicles 27 and 29 in FIG. 3. If the additional boundary condition placed on the geometric movement curves is adjusted such that the steering angle of the motor vehicle 1 is limited, limit trajectories 32 and 33 can be determined. Subsequently, additional intermediate trajectories between trajectories 32 and 33 can be determined and speed profiles can be determined. In doing so, it must be noted that, in this case, additional limit conditions must be placed on the speed profiles, because substantial deviation of the speed profiles from the defined values will mean that other areas, 34 and 35, would be covered by motor vehicles 27 and 29. In the example shown, there is a sufficiently broad vehicle path between limit trajectories 32 and 33. However, even a slight increase in the speed of vehicle 27 or 29 could lead to a significant reduction in the width of the vehicle path and thus only a small number of trajectories would be possible, whereby a critical situation could be determined. In the event of a critical driving situation, one of the predetermined trajectories can be selected as the control trajectory.

In addition to this, it should be noted that other geometric vehicle paths are obviously possible, or the vehicle path shown will be blocked by variation in the speed of the motor vehicle 1. Thus, for example, a significant reduction in the speed of motor vehicle 1 would mean that the vehicle path shown is no longer drivable; however, a new vehicle path would be possible that specifies staying behind motor vehicle 27 until point 31 is reached.

FIG. 4 shows another traffic situation that shows the effect a target route has on the determination of the possible trajectories or of the control trajectory. In the traffic situation shown, motor vehicle 1 is moving towards an intersection wherein motor vehicle 37 coming in the opposite direction turns into the intersection 36 such that the path straight ahead for motor vehicle 1 is blocked. The intersection leads into a one-way street that departs from the intersection 36. Thus, both lanes of the street 42 lead into the same direction of travel. The driver assistance system 2 of motor vehicle 1 can determine separate bands of trajectories, 39 to 41, in the traffic situation shown, wherein the band of trajectories 39 describes turning into the street 42 and the band of trajectories 41 describes further movement along the original street. If the target position for determining the bands of trajectories is then arbitrary, both target position 38 and target position 40 could be determined. In this case, if a critical situation is then determined by the driver assistance system on motor vehicle 1—for example, because the speed of motor vehicle 1 is relatively high—either a trajectory from the band of trajectories 41 or from the band of trajectories 39 is determined as a function of the other parameters for the determination of a trajectory. Thus, it would be possible for the driver assistance system to control the motor vehicle autonomously in a manner that is different than that desired by the driver.

In order to achieve the greatest possible acceptance of the driver assistance system, it is advantageous, however, when autonomous control of the motor vehicle is assumed in a way that it is easily accepted by the driver; this means that it proceeds preferably along a target route that is planned, for example, by a navigation system or that is detected by an activated turn signal or the like. If the driver assistance system 2 of motor vehicle 1 detects that a route turning toward the right is planned, target position 38 can be determined; if, however, the target route proceeds straight ahead, target position 40 can be determined.

For example, it should be assumed that turning onto street 42 is desired. Thus, target position 38 is determined. When calculating the drivable trajectories, initially the band of trajectories 39 can then be exclusively determined, because the band of trajectories 41 may be drivable, but does not lead in the desired direction. If the driver assistance system 2 of motor vehicle 1 then determines in the evaluation of the band of trajectories 39 that a switchover condition has been met, i.e., autonomous driving of the motor vehicle should take place, at least one trajectory is determined, however, on which it is possible to safely drive the motor vehicle within the band of trajectories 39, this trajectory can be determined and driven as the control trajectory. The driver assistance system 2 thus intervenes to only a minimum degree in the driving operation of motor vehicle 1, such that the control of the motor vehicle is taken from the driver for only a short period; the motor vehicle continues to be guided, however, at least essentially along a route desired by the driver.

Depending upon the speed of motor vehicle 1 and the further movement of motor vehicle 37, it may be that no trajectory of the band of trajectories 39 is drivable by motor vehicle 1. In this case, the control device 2 can change or cancel a boundary condition for calculating the trajectories. In the case shown, the limitation of the choice of the target position can be relinquished to street 42, whereby both the trajectories of the band of trajectories 39 and the trajectories of the band of trajectories 41 can be calculated. In the case described, the trajectories of the band of trajectories 39, however, are not drivable due to other boundary conditions to be considered, whereby, in this case, the motor vehicle can be controlled along the trajectories of the band of trajectories 41 up to target position 40.

Due to the procedure described, the driver assistance system 2 of motor vehicle 1 can respond to the depicted traffic situation in a graduated and flexible manner. If it is determined that all or a multitude of trajectories of the band of trajectories 39 are drivable under the other boundary conditions, the driver assistance system 2 will not intervene in the driving operation of the motor vehicle, because initially it is assumed that the driver of the motor vehicle can take control along the potential trajectories in a controlled manner. If, however, only a small fraction of the trajectories of the band of trajectories 39 is possible under the other boundary conditions, this may be interpreted as a critical driving situation, and the motor vehicle 1 can be autonomously controlled by the driver assistance system 2. Even though the autonomous control of the motor vehicle excludes the driver, at least from control of the motor vehicle wherein the total lateral control or the total longitudinal and lateral control can be carried out autonomously by the motor vehicle, the motor vehicle still continues to move, however, along a route that likely corresponds to the route desired by the driver. The short-term wishes of the driver will be ignored for safety reasons, wherein the medium-term driving targets will continue to be met. If, however, it is determined during the analysis of the future driving situations that none of the trajectories of the band of trajectories 39 of motor vehicle 1 can be safely driven under the other boundary conditions, there will be a deviation from the driver's wishes and control of the motor vehicle will be along a route that is not according to the wishes of the driver. With this control, it will still be possible to continue driving the motor vehicle, whereby, in particular, parking the motor vehicle in an undesirable position will be prevented. If no drivable trajectory can be determined, even after adaptation of the boundary conditions, an emergency trajectory can be calculated in a third operating mode of the driver assistance system 2 to prevent collisions or to mitigate collision damage.

FIG. 5 shows an example of another traffic situation in which motor vehicle 1 is driving along a street on which both lanes are blocked by oncoming vehicles 43 and 44. Because both lanes are blocked for motor vehicle 1, there is no open driving area between motor vehicle 1 in area 51 in which the target positions lie that will be achieved by a trajectory of motor vehicle 1, as long as the driving area is exclusively defined as the road. In this case, if there is an attempt to calculate drivable trajectories for motor vehicle 1, it will then be determined that no trajectory will lead motor vehicle 1 to a target position in area 51. The control device must thus determine an emergency trajectory or at least change one of the boundary conditions that are being used during the calculation of the drivable trajectories. These boundary conditions may be, for example, maximum accelerations, maximum component loads, or the like. It is especially advantageous to frequently adjust a driving area. In the situation shown in FIG. 5, it can be determined—for example by a camera on motor vehicle 1—that there are no obstacles in areas 45 and 46, which are adjacent to the road, and that the surface of areas 45, 46 appears to be drivable. Therefore, in the situation shown, in which it initially appears that no drivable trajectory can be determined, areas 45 and 46 are added to the driving area, whereby trajectories are possible within a driving path limited by boundary trajectories 47 and 48 and within a driving path limited by boundary trajectories 49 and 50. The driver assistance system 2 of motor vehicle 1 can then select one of the trajectories within these driving paths while considering other boundary conditions and thus determine a safe trajectory for a target point in area 51.

As was explained with reference to FIG. 1, it is also possible for motor vehicle 1 to recognize when a driver has become incapacitated. In these cases, it is desirable for motor vehicle 1 to stop quickly; however, a safe parking position should first be reached. This is made possible in that the driver assistance system 2 is operated in a fourth operating mode in which the motor vehicle is autonomously controlled up to the safe parking position.

Figure 6:
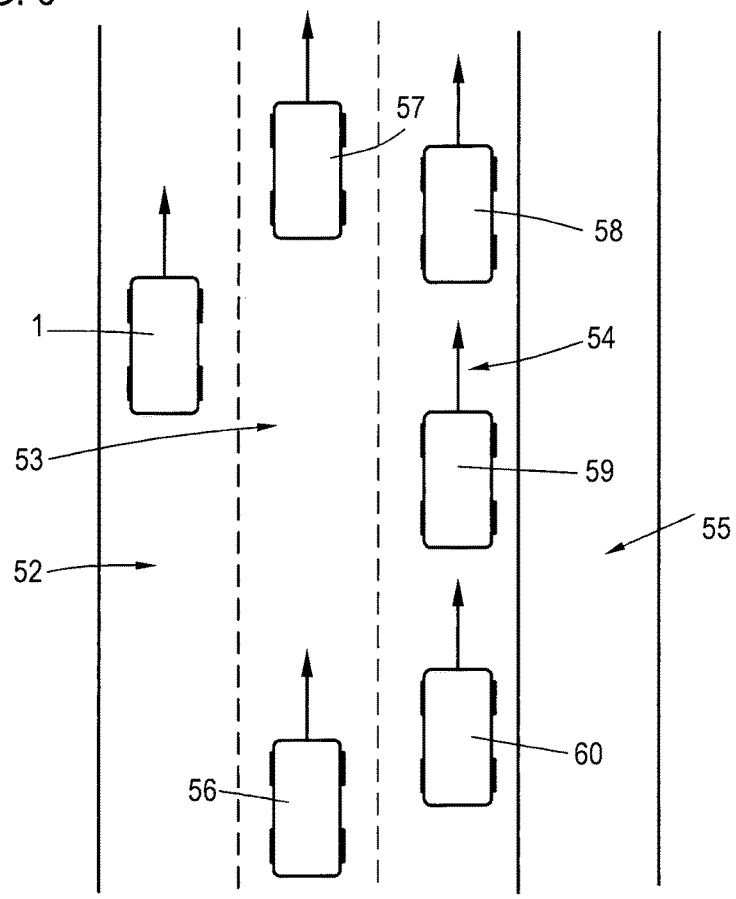
FIG. 6 shows a fourth traffic situation.

In the situation shown in FIG. 6, the motor vehicle 1 is moving on a passing lane 52 of an interstate up to the time at which the incapacity of the driver is established. A position on the shoulder 55 should be reached as a safe parking position. During the autonomous driving of the motor vehicle, it is thus necessary to traverse the center lane 53, as well as the right-hand lane 54. Motor vehicles 56 and 57 are moving in the center lane 53, while motor vehicles 58, 59, and 60 are moving in the right-hand lane 54. Thus, a typical driving situation on interstates is shown in which the traffic density is high in the right-hand lane 54 and in the center lane 53. In such cases, long timeframes may be necessary to move motor vehicle 1 to the shoulder 55.

In order to enable quicker parking of motor vehicle 1 in this situation, the driver assistance system 2 can activate a communication device 6 on motor vehicle 1 to transmit target driving maneuvers to motor vehicles 56, 57, 58, 59, and 60. With the target drive maneuvers, priority information, in particular, can be transmitted that shows that motor vehicle 1 is currently in an emergency situation, whereby there is a prompt for motor vehicles 56, 57, 58, 59, and 60 to follow the transmitted target driving maneuvers to the extent possible.

Figure 7:
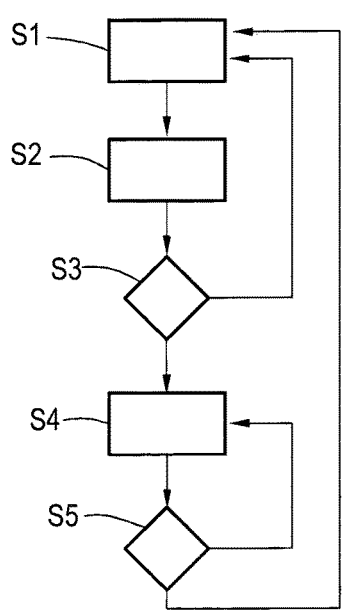
FIG. 7 shows a flowchart of an exemplary embodiment of the process according to the invention.

FIG. 7 shows the basic structure of a process for controlling a motor vehicle. In the normal driving of a motor vehicle, i.e., while the motor vehicle is being controlled by the driver or being controlled by driver assistance systems such that the driver can take over the control interventions of the driver assistance systems at any time, ego data and environmental data are being recorded continuously in step S1. In doing so, many types of information can be recorded regarding the road and the environment of the road, particularly road slopes, gradients, curve radii, road widths, as well as information that allows conclusions to be drawn about the coefficients of friction of the street. This data can be taken from local databases or databases which are accessed wirelessly after the position of the motor vehicle is determined. In particular, the database of a navigation system can be utilized. In addition, ego data of the motor vehicle stored or recorded by sensors arranged in the motor vehicle can be recorded. Data about moving obstacles—particularly about other motor vehicles or pedestrians—can also be recorded, wherein future movements of moving obstacles can be depicted in a movement model.

In step S2, future driving situations for the motor vehicle for a specified time interval are determined from the data collected and determined in step S1. Multiple possible trajectories for the motor vehicle are calculated to determine future driving situations.

In step S3, there is a check to determine whether a switchover condition has been met. The switchover condition depends, at a minimum, on the future driving situations. Thus, it can be detected that in the future the motor vehicle will move close to a physical limit range. Alternatively, it can be detected that, in future driving situations, control of the motor vehicle is only possible such that it will be at the edge of a comfort range of a driver. The switchover condition depends upon driving situations and, optionally, upon a characteristic of the driver. If such a switchover condition is not met in step S3, the process is repeated, starting from step S1.

If the switchover condition in step S3 is met, however, a temporary switchover into the second operating mode of the driver assistance system takes place. In the second operating mode, the motor vehicle is steered autonomously, meaning, without the possibility of intervention by the driver. The motor vehicle is controlled such that driving is continued to the extent possible; this means that the motor vehicle will continue to be moved at least up until a critical situation has been overcome. During the autonomous movement, there is a check in step S5 to determine whether a reset condition has been met for resetting back to the first operating mode. One reset condition is that the switchover condition has not been met; this means that the critical driving situation has been overcome, and that the environmental and ego data of the motor vehicle indicate that it is possible to safely return control of the vehicle to the driver. If the reset condition has not been met, the autonomous driving mode is continued in step S4. In the event that the reset condition is met, further movement of the motor vehicle continues under the control of the driver. In doing so, an additional step, which is not shown, is introduced in which a prompt for resumption of control is given to the driver and control of the motor vehicle is not returned to the driver until after a driver action has been detected that indicates resumption of said control.

Figure 8:
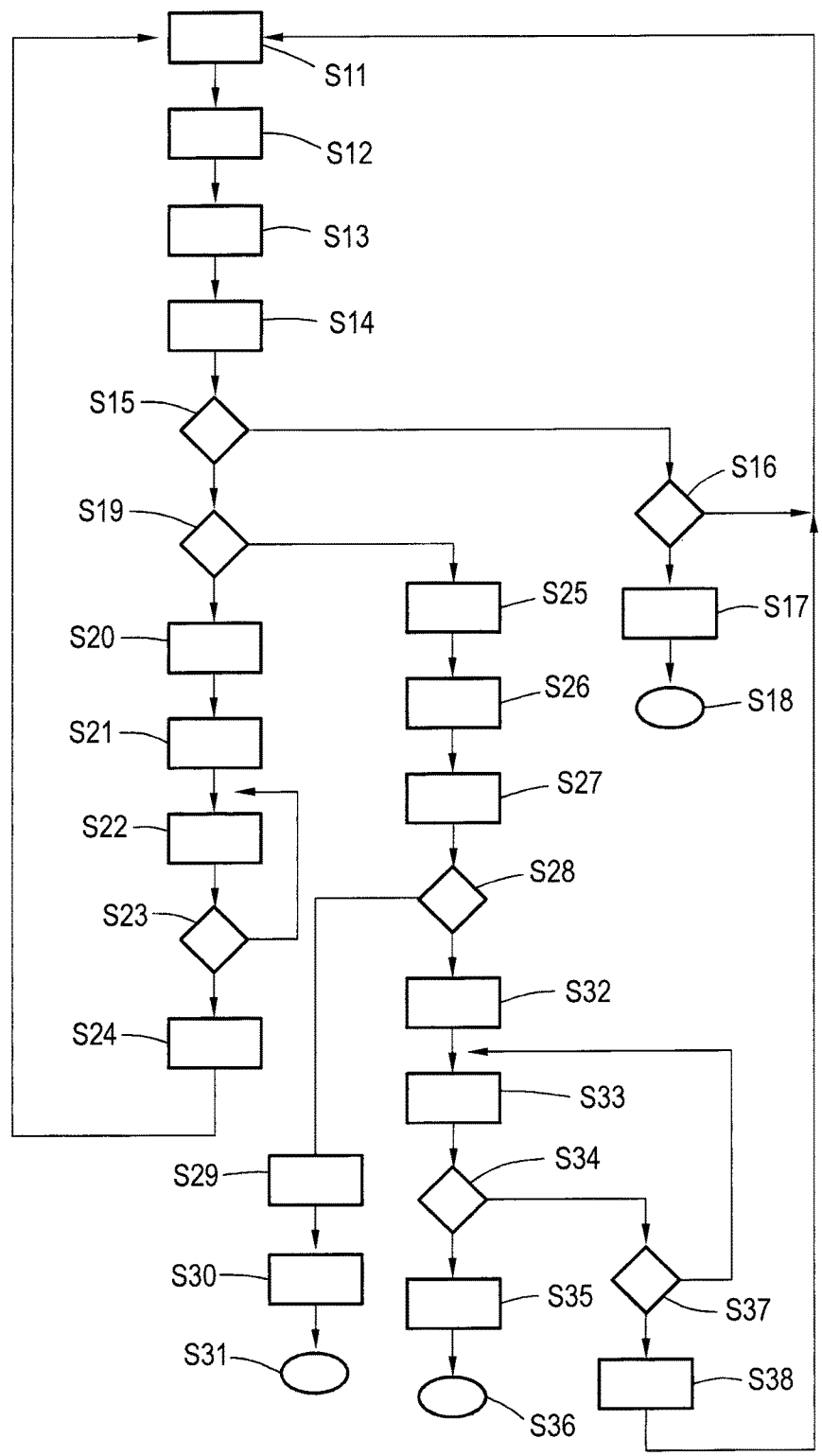
FIG. 8 shows a flowchart of another exemplary embodiment of the process according to the invention.

FIG. 8 shows a further exemplary embodiment of a process for controlling a motor vehicle. As is obviously discernible for one of ordinary skill in the art, a few of the steps shown are optional and represent advantageous manifestations of the process.

As has been previously described regarding FIG. 7, the motor vehicle is typically operated such that the motor vehicle is controlled by the driver in the process shown in FIG. 8 as well. During this operation, a large quantity of ego and environmental data is collected, and movement models are created and evaluated for moving obstacles in step S11, as was explained regarding step S1 of FIG. 7. In step S12, a driving area is determined from the data determined in step S11 between the target position of the motor vehicle and the area in which one or more target positions lie.

The driving area comprises the entire road or certain lanes of the road, wherein areas are excluded that are blocked by fixed or moving obstacles.

In step S13, a multitude of trajectories is determined in the area determined in step S12. Trajectories are determined by evaluating certain boundary conditions that follow from the ego and environmental data, and, in particular, the trajectories are calculated based upon the driving area restrictions. Further boundary conditions for calculating the trajectories may be, for example, maximum accelerations for the motor vehicle that result from the frictional force between the road and the tires. In addition, it is also possible to consider characteristics of the driver when setting the limit conditions. For example, it is possible for a driver to adjust the motor vehicle to a sport or comfortable driving behavior before starting a trip. According to this adjustment, the potential parameter range of the trajectories can also be limited. The calculation of trajectories can initially take place purely by means of a calculation of loci and subsequent determination of speed profiles along these loci; however, trajectories can also be calculated that already comprise locations and speeds or locations and times and which may additionally comprise other parameters. Trajectories are calculated individually or as parameterized bands of trajectories with assigned value ranges for the parameters.

In step S14, individual trajectories can be rejected or value ranges of bands of trajectories can be excluded that do not meet certain additional boundary conditions. Particularly when complex calculation processes that consider a multitude of parameters are used for the trajectories in step S13, it is often advantageous not to initially apply some boundary conditions and to remove trajectories that do not meet these boundary conditions from the quantity of trajectories calculated in step S14. However, it is also possible for trajectories to be initially calculated in step S13 under relatively broad boundary conditions—for example, the boundary condition that the trajectory is physically drivable—and to use narrow boundary conditions in step S14—for example, that a trajectory is drivable within a comfort range of a driver. Thus, an upper quantity and a lower quantity of trajectories can be set, wherein, initially, there is an attempt to move the motor vehicle within the lower quantity of trajectories, wherein, if necessary, it is possible to expand the trajectory area to the upper quantity.

In step S15, there is a check to determine whether a switchover criterion has been met by the trajectories determined in steps S13 and S14. Such a switchover criterion may relate, in particular, to the width of vehicle paths or to the quantity of trajectories. In the simplest case, the number of calculated trajectories can be compared to a threshold value. This is possible, in particular, when the parameters of the trajectories have been previously discretized; this means continuous bands of trajectories are represented by a plurality of individual trajectories that are spaced apart in the parameter range. A certain quantity of trajectories close to one another is thereby determined to be equivalent and represented by a single trajectory. As an alternative, it is also possible for bands of trajectories, i.e., particularly parameterized vehicle paths, to have been calculated in steps S13 to S14, wherein, in this case, the value range of a parameter or multiple parameters can be considered. In the simplest case, the geometric width of the broadest trajectory here can be checked at the narrowest point. If multiple trajectories are present, the individual widths of the value ranges may also be totaled, however, or the spatial phase capacity can be determined for the bands of trajectories and considered individually or totaled.

If the switchover condition in step S15 is not met, there is an additional check in step S16 to determine whether the driver has become incapacitated. To do this, camera data or the steering movements of the driver can be evaluated. By means of the data obtained, loss of consciousness or driver fatigue can be detected. If there is no driver incapacity determined in step S16, the process is continued starting at step S11, whereby the control of the vehicle remains with the driver.

If the driver is determined to be incapacitated, the driver assistance system switches into the fourth operating mode and, in step S17, the autonomous driving mode is introduced until there is a safe parking position. In this step, in the event of an unconscious or otherwise ill driver, it is additionally possible to initiate an emergency call, or issue target driving maneuvers to other vehicles, to enable safe parking of the motor vehicle or the like. Upon reaching a safe parking position, the motor vehicle is stopped in step S18. Thus, in this case, the process ends.

If it is determined in step S15 that the switchover criterion has been met, the driver assistance system switches into the second operating mode, and it is determined in step S19 whether at least one trajectory could be determined, i.e., whether safe driving of the motor vehicle is even possible. If this is the case, a warning can be emitted to other motor vehicles in step S20 that the motor vehicle is likely being operated in a physical limit range, because a switchover criterion has been already determined in step S15. The issuing of a warning in step S20 can then be omitted if the switchover conditions in step S15 have been met, because the motor vehicle is being moved outside of the comfort range of a driver, and continues to move but maintains a sufficiently great distance from the physical limit range. In addition, a warning device can be activated in step S20 to notify the driver that autonomous driving has commenced.

If multiple drivable trajectories have been determined in steps S13 and S14, the control trajectory can be selected from these trajectories in step S21. If only one drivable trajectory was determined, then this is the selected control trajectory. To select the trajectory, a multitude of optimization criteria can be utilized. In particular, a safe distance with respect to obstacles and to the edge of the road can be optimized. At the same time, attempts to minimize the longitudinal and/or lateral accelerations can be made. The goal of the optimization conditions can be to enable the safest possible driving of the motor vehicle, wherein, at the same time, the trajectory driven deviates the least from the predicted wishes of the driver.

In step S22, driving continues along the trajectory selected in step S21, wherein the driver assistance system autonomously controls at least the motor vehicle—in particular, however, controls the entire lateral control or the entire longitudinal and lateral control of the motor vehicle. In doing so, the trajectory can be adapted as needed—in particular, based upon newly determined environmental and ego data.

In step S23, there is a check to determine whether a reset condition has been met. This takes place in a manner that is equivalent to the check of the reset conditions in step S5 of FIG. 7. If no reset condition is determined, autonomous driving continues in step S22. While the reset conditions are being determined, vehicle control returns to the driver in step S24, wherein this can be designed in different ways. In particular, a warning signal can be given to the driver that resumption of control should occur. Resumption of control can take place only after a specified action by the driver is discerned.

After the resumption of control in step S24, the driver assistance system switches into the first operating mode, the process is continued in step S11, and the motor vehicle is again controlled by the driver.

In the event that it is determined in step S19 that no drivable trajectory could be determined for the vehicle, a warning is given to the driver in step S25, because, in this case, it is assumed that an accident is unavoidable or that the motor vehicle must be operated with expanded boundary conditions, i.e., at least by reducing driving comfort. In step S26, the boundary conditions for determining the trajectories are adapted. If the trajectories have been initially determined in steps S13 and S14 such that the road trajectories describe a comfort range of the driver, it is then possible to expand the boundary conditions to include a physical limit range. In addition, it is possible to expand the driving area. Thus, when there are no obstacles adjacent to a road, the areas next to the road are then added to the driving area.

After the adaptation of the boundary condition, an attempt is made in step S27 to determine an optimum trajectory having the adapted boundary conditions. A check is made in step S28 to determine whether at least one potential trajectory has been determined in step S27. If this is not the case, it is assumed that no trajectory can be determined in which personal injury, damage to the motor vehicle, and/or damage to other objects can be completely avoided. Therefore, the driver assistance system switches to a fourth operating mode, and an emergency trajectory is calculated in step S29 with which the personal injury and damage can be mitigated to the extent possible. The calculation of trajectories that mitigate injury and damage during unavoidable accidents is known in the prior art. This trajectory can be implemented in step S30 and typically ends in step S31 with the stopping of the motor vehicle. Because in this case it must be assumed that a damage/injury situation is at hand, certain vehicle systems can also be switched off or emergency calls generated in step S31.

If it is determined in step S28 that there is a drivable trajectory with the adjusted boundary conditions, preparatory steps can be undertaken. The corresponding trajectory can then be implemented in step S33. Because the trajectory is typically carried out in the limit range, a check is carried out in step S34 to determine whether a problem has occurred—particularly damage to the motor vehicle or an unexpected vehicle movement. In this case, the vehicle can be stopped in a targeted manner in step S35, whereby the process ends with the stopping of the vehicle in step S36. If it is determined in step S34 that the motor vehicle is being moved in a controlled manner along the trajectory, a check can be done in step S37 to determine whether a reset condition is present. If this is not the case, the trajectory continues to be implemented in step S33. The check of the reset condition corresponds to step S23. If the return of control condition is met, control is returned to the driver in step S38, just as in step S24, upon which the driver assistance system switches into the first operating mode, and the process in step S11 is continued with normal driving.

The invention claimed is:

1. A motor vehicle, comprising:
   a driver assistance system configured to:
   pre-calculate future driving situations of the motor vehicle for a specified time interval based on data associated with a physical characteristic of the motor vehicle and data associated with an environment of the motor vehicle, wherein the motor vehicle is controllable by a driver in a first operating mode of the driver assistance system;
   upon meeting a switchover condition based on the future driving situations, switch the motor vehicle into a second operating mode, wherein the motor vehicle in the second operating mode is autonomously controlled by the driver assistance system without a possibility of intervention by the driver, and driving is continued in the second operating mode;
   calculate, in the second operating mode, a prediction that the switchover condition is met at a point lying ahead in a driving direction of the motor vehicle; and
   determine, in the second operating mode, a target position at which the switchover condition is predicted to be unsatisfied.

2. The motor vehicle according to claim 1, wherein the driver assistance system is further configured to:
   determine a target route of the motor vehicle desired by the driver based on route data of a navigation system, the data associated with the physical characteristic of the motor vehicle, or the data associated with the environment of the motor vehicle, wherein the target position is on the target route.

3. The motor vehicle according to claim 1, wherein the driver assistance system is further configured to:
   determine the target position based on a predicted traffic situation or a route course that allows safe transfer of vehicle control to the driver at the target position.

4. The motor vehicle according to claim 3, wherein the driver assistance system is further configured to:
   switch the motor vehicle from the second operating mode into the first operating mode based on a reset condition, wherein the reset condition is based on the switchover condition not being met, the predicted traffic situation that allows the safe transfer of vehicle control back to the driver, or the target position having been reached.

5. The motor vehicle according to claim 1, wherein the driver assistance system is further configured to:
determine a control trajectory based on a current position of the motor vehicle and the target position; and
control the motor vehicle along the control trajectory in the second operating mode.

6. The motor vehicle according to claim 1, wherein the driver assistance system is further configured to:
control, in the second operating mode, brake systems, an engine, a steering system, or an automatic transmission of the motor vehicle without intervention by the driver.

7. The motor vehicle according to claim 5, wherein the driver assistance system is further configured to:
calculate multiple drivable trajectories based on the current position of the motor vehicle and a boundary condition, wherein the boundary condition is determined based on the data associated with the physical characteristic of the motor vehicle and the data associated with the environment of the motor vehicle.

8. The motor vehicle according to claim 7, wherein the driver assistance system is further configured to:
determine a driving area that is drivable by the motor vehicle based on the current position of the motor vehicle, wherein the boundary condition is that the multiple drivable trajectories lie completely within the driving area.

9. The motor vehicle according to claim 8, wherein the driver assistance system is further configured to:
calculate the multiple drivable trajectories based on a parameter, wherein the parameter comprises a location coordinate, wherein the multiple drivable trajectories comprise a continuous band of trajectories based on the parameter or discrete trajectories based on the parameter, wherein the discrete trajectories are spaced apart by a specifiable distance.

10. The motor vehicle according to claim 7, wherein the driver assistance system is further configured to:
determine a speed profile for a drivable trajectory of the multiple drivable trajectories.

11. The motor vehicle according claim 7, wherein the driver assistance system is further configured to:
determine a threshold value for a parameter of the motor vehicle based on the multiple drivable trajectories, wherein the switchover condition is exceeding of the threshold value or failure to maintain the threshold value.

12. The motor vehicle according to claim 7, wherein the switchover condition is exceeding a minimum value specifying a number of the multiple drivable trajectories or a width of a value range of a parameter that defines a band of trajectories of the multiple drivable trajectories.

13. The motor vehicle according claim 7, wherein the driver assistance system is further configured to:
determine there is no drivable trajectory;
adjust the boundary condition based on the determination that there is no drivable trajectory; and
recalculate the multiple drivable trajectories based on the determination that there is no drivable trajectory.

14. The motor vehicle according claim 13, wherein the driver assistance system is further configured to:
switch the motor vehicle into a third operating mode based on there being no drivable trajectory and after the adjustment of the boundary condition; and
determine, in the third operating mode, an emergency trajectory.

15. The motor vehicle according to claim 1, wherein the driver assistance system is further configured to:
activate an indicator device based on switching the motor vehicle into the second operating mode or before switching the motor vehicle into the first operating mode, wherein the indicator device provides an audible, haptic, or visible warning to the driver to resume control of the motor vehicle.

16. The motor vehicle according to claim 1, further comprising:
a communication device for wireless vehicle-to-vehicle communication or wireless vehicle-to-infrastructure communication, wherein the driver assistance system is further configured to:
receive, via the communication device, the data associated with the environment of the motor vehicle from a digital database external to the motor vehicle; and
transmit, via the communications device, a warning message to a second motor vehicle.

17. The motor vehicle according to claim 1, wherein the driver assistance system is further configured to:
control a steering system, a braking system, an engine, or an automatic transmission of the motor vehicle in a fourth operating mode without intervention by the driver, wherein the motor vehicle is in a parking position in the fourth operating mode.

18. The motor vehicle according to claim 17, wherein the driver assistance system is further configured to:
detect the driver is incapacitated; and
switch the motor vehicle into the fourth operating mode based on the driver being incapacitated.

19. The motor vehicle according to claim 17, wherein the driver assistance system is further configured to:
wait for a driver input to resume driver control during the switch of the motor vehicle from the second operating mode to the first operating mode; and switch the motor vehicle into the fourth operating mode based on not receiving the driver input within a specified time interval.

20. The motor vehicle according to claim 17, wherein the driver assistance system is further configured to:
switch the motor vehicle into the fourth operating mode when a defined minimum number of switches or a defined minimum frequency of switches from the first operating mode to the second operating mode occurs within a specified timeframe.

21. The motor vehicle according to claim 17, further comprising:
a communication device, wherein the driver assistance system is further configured to: determine, in the fourth operating mode, a target driving maneuver for a second motor vehicle; and
transmit, via the communications device, the target driving maneuver to the second motor vehicle, wherein a priority message is transmittable in addition to the target driving maneuver.

22. The motor vehicle according to claim 7, wherein the switchover condition utilizes the boundary condition to calculate the multiple drivable trajectories, and wherein the driver assistance system is further configured to:
determine of the control trajectory based on a defined driver characteristic or a driver characteristic determined by the driver assistance system.

23. A method for controlling a motor vehicle, comprising:
detecting data associated with a physical characteristic of a motor vehicle and data associated with an environment of a motor vehicle, wherein the motor vehicle is controllable by a driver in a first operating mode;

pre-calculating future driving situations of the motor vehicle for a specified time period based on the data associated with the physical characteristic of the motor vehicle and the data associated with the environment of motor vehicle;
determining a switchover condition is met based on the future driving situations;
switching the motor vehicle into a second operating mode based on the switchover condition being met;
steering the motor vehicle without intervention of the driver in the second operating mode;
calculating, in the second operating mode, a prediction that the switchover condition is met at a point lying ahead in a driving direction of the motor vehicle; and
determining, in the second operating mode, a target position at which the switchover condition is predicted to be unsatisfied.

* * * * *